(12) United States Patent
Steinbrecher

(10) Patent No.: US 7,269,097 B1
(45) Date of Patent: Sep. 11, 2007

(54) METHOD FOR RECOVERING DATA FROM A LARGE ARRAY OF LOST-COST SENSORS

(75) Inventor: Donald H. Steinbrecher, Brookline, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 11/363,302

(22) Filed: Feb. 27, 2006

Related U.S. Application Data

(60) Provisional application No. 60/729,290, filed on Oct. 19, 2005.

(51) Int. Cl.
*H04B 11/00* (2006.01)
(52) U.S. Cl. .................................... 367/134
(58) Field of Classification Search ............... 367/134
See application file for complete search history.

(56) References Cited

U.S. PATENT DOCUMENTS

| | | | |
|---|---|---|---|
| 4,041,442 A | 8/1977 | Marquardt | |
| 4,446,542 A | 5/1984 | Beckerle | |
| 5,126,978 A | 6/1992 | Chaum | |
| 5,303,207 A | 4/1994 | Brady et al. | |
| 5,566,173 A * | 10/1996 | Steinbrecher | ............... 370/466 |
| 5,687,137 A | 11/1997 | Schmidt et al. | |
| 2005/0088299 A1 | 4/2005 | Baridy et al. | |

* cited by examiner

*Primary Examiner*—Daniel Pihulic
(74) *Attorney, Agent, or Firm*—James M. Kasischke; Michael P. Stanley; Jean-Paul A. Nasser

(57) ABSTRACT

The present invention provides a system and method of use for recovering data from an area. The data are gathered with at least one sensor converting the data to a digital packet. The packet is processed as encoded data and the encoded data is stored as a data frame. A reader transmits a signal to a plurality of the sensors and replicates the signal. Each sensor produces a reflected signal in response to the transmit signal and assigns a modulation frequency to the reflected signal. The reader receives the reflected signal. The reader separates frequency components of the reflected signal into upper and lower sidebands and separates the sidebands into data channels. The reader outputs the encoded data by processing the data channels. The reader decodes the encoded data to retrieve the data packet and the environmental data.

17 Claims, 46 Drawing Sheets

$$S/N = \frac{\eta p}{FB\left[4\pi s \sin\left(\frac{\theta}{2}\right)\right]^4}$$

| Parameter | Default Value |
|---|---|
| η | 0.5 (ratio) |
| F | 1.6 (ratio) |
| B | 10 Hertz |
| θ | 60 degrees |
| λ | 0.1 meter |

FIG. 7

| Sea State | $A_W$ Wave Height | Period | $H_P$ Ant Height | $\delta$ Delta | Above Horizon |
|---|---|---|---|---|---|
| number | meters | Seconds | meters | ratio | Seconds |
| 3 | 0.88 | 7.5 | 0.8 | 0.47 | 3.52 |
| 4 | 1.89 | 8.8 | 0.8 | 0.30 | 2.68 |
| 5 | 3.26 | 9.7 | 0.8 | 0.23 | 2.21 |

$$\delta = \frac{T_A}{T} = \frac{1}{\pi} \text{ArcCos}\left(1 - \frac{H_P}{A_W}\right)$$

FIG. 37

Packet Period and Packet Length Determine the Optimum FSK Bandwidth and Modulation Index.

| Parameter | Units | Value |
|---|---|---|
| Data Packet Period: | Second | 0.5 |
| Packet Length: | Bits | 100 |
| Modulation Period: | Second | 0.005 |
| Optimum Abs(f1-f2): | Hz | 286 |
| Noise Bandwidth: | Hz | 858 |

FIG. 39

The Range Equation $$P_{RX} = P_{TX} G_{RT} G_{RR} \eta G_M^2 (\lambda/4\pi S)^4$$

- Power Received by Subsystem Receiver 14 → $P_{RX}$
- Power Transmitted by Transmit Signal Generator 15 → $P_{TX}$
- Reader Transmit Antenna 12 Gain → $G_{RT}$
- For Reader Reception Antenna 12 Gain → $G_{RR}$
- Efficiency of Modulator 24 → $\eta$
- Antenna Gain of Modulator 24 → $G_M$
- Wavelength of Signal from Reader 10 → $\lambda$
- Reader 10-Modulator 24 Separation → $S$

FIG. 40

|  |  | Tx-Sensor | Sensor-Rx |
|---|---|---|---|
| Transmit Power: | dBm | 23.00 | -16.83 |
| Antenna Gain: | dBi | 14.40 | 1.50 |
| Range to Sensor: | dBmeter | 3.87 | 13.62 |
| Sensor Ant. Gain: | dBi | 1.50 | 11.00 |
| Wavelength | dBmeter | -10.00 | -10.00 |
| 4 pi | dBunity | 10.99 | 10.99 |
| Capture Area: | dBsqmeter | -29.49 | -19.99 |
| Power Received: | dBm | -10.83 | -73.55 |
| Modulator Loss | dBunity | -6.00 | |
| Sensor Transmit Power: | dBm | -16.83 | |
| Measured Power: | dBm | | -74 |

Calculated Received Power

FIG. 42

Reader Transmitter Power Requirement to Achieve BER = 1E-6 at 2,500 meters.

| Parameter | Units | 100 W | 500 W | 1 kW |
|---|---|---|---|---|
| Range: | meters | 1651 | 2500 | 2937 |
| Path Loss: | dB | -176.67 | -183.87 | -186.67 |
| Noise Floor: | dBW | -171.67 | -171.67 | -171.67 |
| S/N for BER=1E-6 | dB | 15.00 | 15.00 | 15.00 |
| RCV Signal Power: | dBW | -156.67 | -156.67 | -156.67 |
| XMT Power: | dBW | 20.00 | 27.20 | 30.00 |

FIG. 43

| Peak READ Power = 500 Watts ||
|---|---|
| READS/Hr | Avg Power |
| 1 | 1.4W |
| 2 | 2.8W |
| 4 | 5.6W |

FIG. 44

METHOD FOR RECOVERING DATA FROM A LARGE ARRAY OF LOST-COST SENSORS

CROSS-REFERENCE TO RELATED APPLICATIONS

This application claims the benefit of U.S. Provisional Application No. 60/729,290 filed Oct. 19, 2005 and which is entitled "Method For Recovering Data From A Large Array Of Lost-Cost Sensors" by Donald H. Steinbrecher.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a system and a method of use for recovering data from an array of sensors deployed over a contiguous region such as a curved earth with a varying surface as would be the case for a large body of water or a large land mass.

(2) Description of the Prior Art

It is known in theatre operations that a need exists for a detection system and method of use that satisfies a requirement for cueing in littoral regions of interest. One type of present system is described as "Large N" because the assumption is that a very large number "N" of sensors will be deployed over a region and that data from the sensors will allow remote detection of entities navigating in the region.

To enhance existing data collection, a need exists for an improved system and method of use to recover environmental data packets from individual sensing elements in a comparatively-inexpensive manner and to transmit the data to a reader and onto a regional data fusing facility. Such a system would comprise a collection of communications links between a single reader and a numerically high amount (approximately 1000) of sensors. Optimally, the method would employ the device of U.S. patent application Ser. No. 11/061,164; filed Feb. 25, 2005 and entitled "A Low-Power Remotely Readable Sensor".

SUMMARY OF THE INVENTION

Accordingly, it is a general object of the present invention to provide a system and method of use for recovering data from individual sensors and transmitting packets of the data to a remote reader.

Another object of the present invention is to provide a system and method of use where sensors are deployed over large areas in order to develop a common picture of an environmental parameter for theater operations To attain the objects described, the system of the present invention comprises a plurality of sensors deployed within an area. Each sensor is pre-assigned a random modulation frequency. A reader is deployed either within the area or outside the area.

The environmental data is gathered with at least one sensor wherein the sensor converts the environmental data to a digital data packet. The digital data packet is processed to form encoded data and the encoded data is stored as a data frame. The sensor also outputs a modulation sequence.

The reader transmits a signal to the sensors and replicates the signal. Each sensor produces a reflected signal in response to the transmit signal and the sensor also assigns the modulation frequency to the reflected signal. The reader receives the reflected signal from the sensor with the assigned modulation frequency.

The reader separates frequency components of the received reflected signal into upper and lower sidebands and separates the upper and lower sidebands into unique data channels. The reader outputs the encoded data by processing the data channels and decodes the encoded data to retrieve the digital data packet and the environmental data.

Each reader services a number of sensors distributed over an area—preferably surrounding the reader. The number of sensors associated with a single reader may be numerous and may, in some applications, number in the thousands.

To uniformly serve an area using a plurality of readers, each reader is assigned to a "cell" which tessellates to fill the area. Each cell is made up of a plurality of identical tiles with a minimum separation occurring when the sides of adjacent tiles are aligned. The maximum number of cells that can be served by a single reader is determined by the reader architecture, the data-channel bandwidth, the stability of the sensor modulation circuitry, and other parameters of the system.

The sensors are independent from the reader so that any sensor can work with any reader. Further, the sensors can be inexpensive while the reader can be stealthy and secure. The readers, which are attached to buoys, can be retrieved for future use while the sensors may be programmed to self-destruct after each application, which would provide an improved level of stealth in a large field of operation. The reader system may be used for digital implement of transfer functions with the use of the description that follows by one ordinarily skilled in the art without undue experimentation.

BRIEF DESCRIPTION OF THE DRAWINGS

Thus by the present invention its objects and advantages will become readily apparent upon reading the following detailed description taken in conjunction with the accompanying drawings, in which:

FIG. 7 depicts a signal-to-noise-ratio equation and table reflecting a reader-to-sensor line-of-sight geometry over a smooth Earth and providing default values for parameters of the equation;

FIG. 37 is a table of sea states and the time periods that an antenna is above the horizon during the sea states;

FIG. 39 is a table in which an optimum FSK bandwidth and modulation index are determined from a data packet period and packet length;

FIG. 40 depicts an equation expressing the power received by the receiver subsystem of the reader in terms of system parameters;

FIG. 42 is a table reflecting the results of the modulator range test of FIG. 46;

FIG. 43 is a table reflecting a reader transmitter power requirement to achieve a Bit Error Rate (BER);

FIG. 44 is a table reflecting a number of reads/hour at an average power;

DESCRIPTION OF THE PREFERRED EMBODIMENT(S)

The disclosed system and method of use, derived from and incorporating by reference U.S. patent application Ser. No. 11/061,164, uses a data-collection system with the following characteristics: a reader transmits an unmodulated incident RF signal in the direction of a sensor. Data from the sensor is used to modulate the reflection coefficient of an antenna termination thereby causing the incident RF signal to be reflection modulated with the sensor data. A significant advantage is realized because the sensor requires no RF components, except an antenna and a single diode, which is used to modulate the incident RF signal. Furthermore, a significant power reduction is realized because the power required to drive the modulator diode is typically less than one one-thousandth of a Watt. Thus the sensor may also be used in applications requiring stealth because no signal of any kind is independently transmitted from the sensor. The return signal is demodulated by the reader in order to recover the data returned by the sensor.

In the present invention, another feature of the data-collection system is described in which a reader transmitting a single RF signal may receive data from a plurality of sensors located within the field-of-view of the reader. The number of sensors associated with a single reader may be numerous and may, in some applications, number in the thousands. The system and method of use of the present invention also describes operations for theater applications where sensors may be deployed over large areas in order to develop a common picture of an environmental parameter.

To clarify the steps of this method, a specific configuration is assumed in order to set parameters. The clarification and description presented herein should not be construed to limit the claims associated with the disclosed method.

It is assumed that each reader services "N" sensors uniformly distributed over an area surrounding the reader and that the sensors and reader are each configured with a bi-conical antenna that has a radially-symmetric gain pattern. The uniform gain of such an antenna may be approximated by $$\frac{1}{\text{SIN}\left(\frac{\theta}{2}\right)}$$

in which theta represents the vertical angle subtended by the primary gain lobe. For example: when the vertical angle, θ is about 30 degrees, the main lobe gain is about 6 dB.

Figure 1:
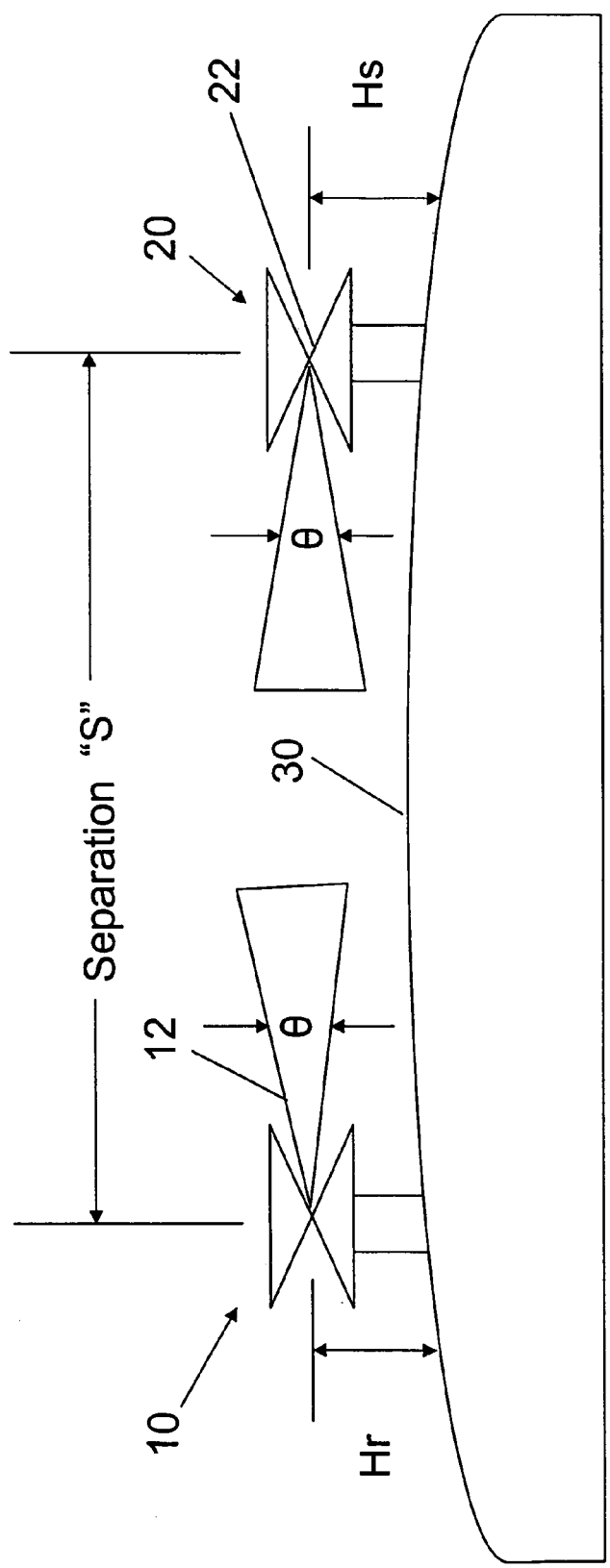
FIG. 1 depicts a reader-to-sensor separation.

A typical reader-to-sensor line-of-sight path geometry over a smooth earth is illustrated in FIG. 1. In FIG. 1, a reader 10 and sensor 20 have identical antennas 12, 22 with identical horizontal gain;

$$G = \frac{1}{\text{SIN}\left(\frac{\theta}{2}\right)}, \quad (1)$$

in which 'θ' is the vertical beam angle of the radially symmetric main lobe of the reader antenna and the sensor antenna.

Parameter definitions are:

| | |
|---|---|
| P = | [reader transmit signal generator power]/[kT$_0$] |
| k = | Boltzman's constant |
| T$_0$ = | Standard temperature = 290 degrees Kelvin |
| η = | [sensor modulator efficiency] |
| F = | [reader receiver subsystem noise figure] |
| B = | [reader receiver subsystem detection bandwidth associated with each sensor] |
| S = | [reader-to-sensor separation measured in wavelengths] |

Then, the maximum sensor to reader channel capacity, C, expressed in bits/Hz in the bandwidth B, can be shown by the expression:

$$C = \log_2\left\{1 + \frac{\eta P}{FB[4\pi s \sin(\theta/2)]^4}\right\}. \quad (2)$$

Equation (2) is recognized as the Shannon formula for channel capacity, which identifies the second term inside the 'log' brackets as the system signal-to-noise ratio. The maximum line-of-sight (LOS), separation path length, S, is first limited by the curvature of the Earth. The maximum LOS length over a smooth curved Earth 30 is a function of the height, Hr, of the reader antenna 12 and the height, Hs, of the sensor antenna 22. It is normal to base the calculation assuming a value for the Earth radius that is four-thirds the actual radius in order to account for parallax in the atmosphere of the Earth. Also, the sensor antenna height, Hs, is assumed to be small and not affect an increase in the path length. The height of the reader antenna, Hr, will determine the maximum path length according to the expression:

$$\frac{S}{R} = \left[2\frac{Hr}{R}\right]^{1/2}. \quad (3)$$

In this expression, R is the four-thirds Earth radius. By substituting an average value for the Earth radius in meters, Equation (3) can be rewritten in the form:

$$S = 4000[Hr]^{1/2} \text{meters}. \quad (4)$$

Figure 2:
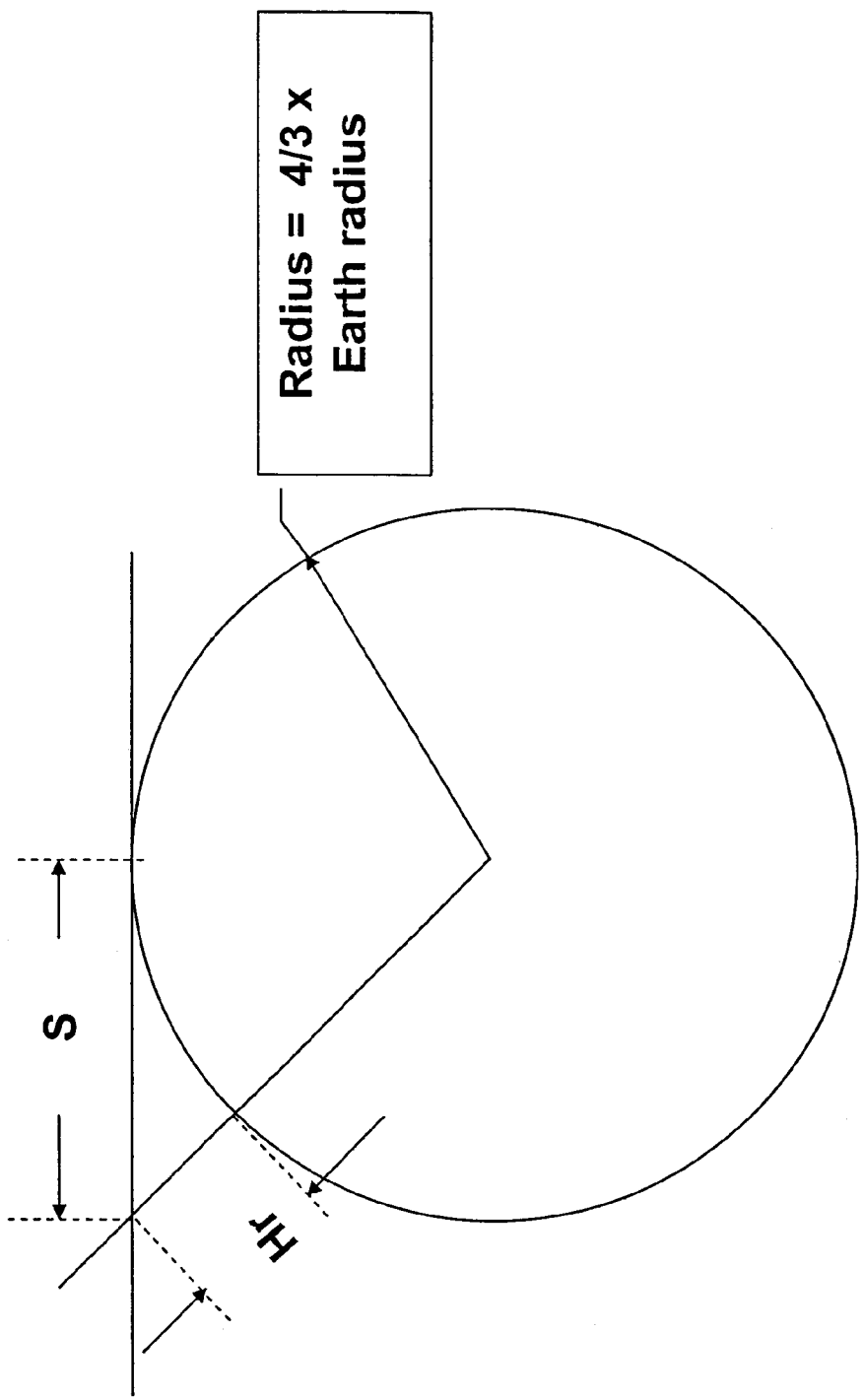
FIG. 2 depicts a line-of-sight separation geometry over a smooth 4/3 Earth in relation to a reader antenna.

In Equation (4), Hr represents the height of the reader antenna 12 in meters while "S" represents the range at which a straight line from a point Hr meters above the Earth surface to the point where the straight line is tangent to the surface of the (4/3) Earth 30. The line-of-sight length, S, is also sometimes called the "slant range" and sometimes called the "radio horizon" associated with a "height of eye" at Hr meters above the surface. A line-of-sight path geometry over smooth 4/3 Earth is illustrated in FIG. 2.

As the sea state increases, it becomes more difficult for the reader 10 to illuminate modulators 24 of the sensors 20, especially when the sensors are located in wave shadows. The height of the reader antenna 12 can be raised to overcome the shadowing, but the necessary heights may become quite large and may be impractical. Another concept of operations is more practical.

Figure 3:
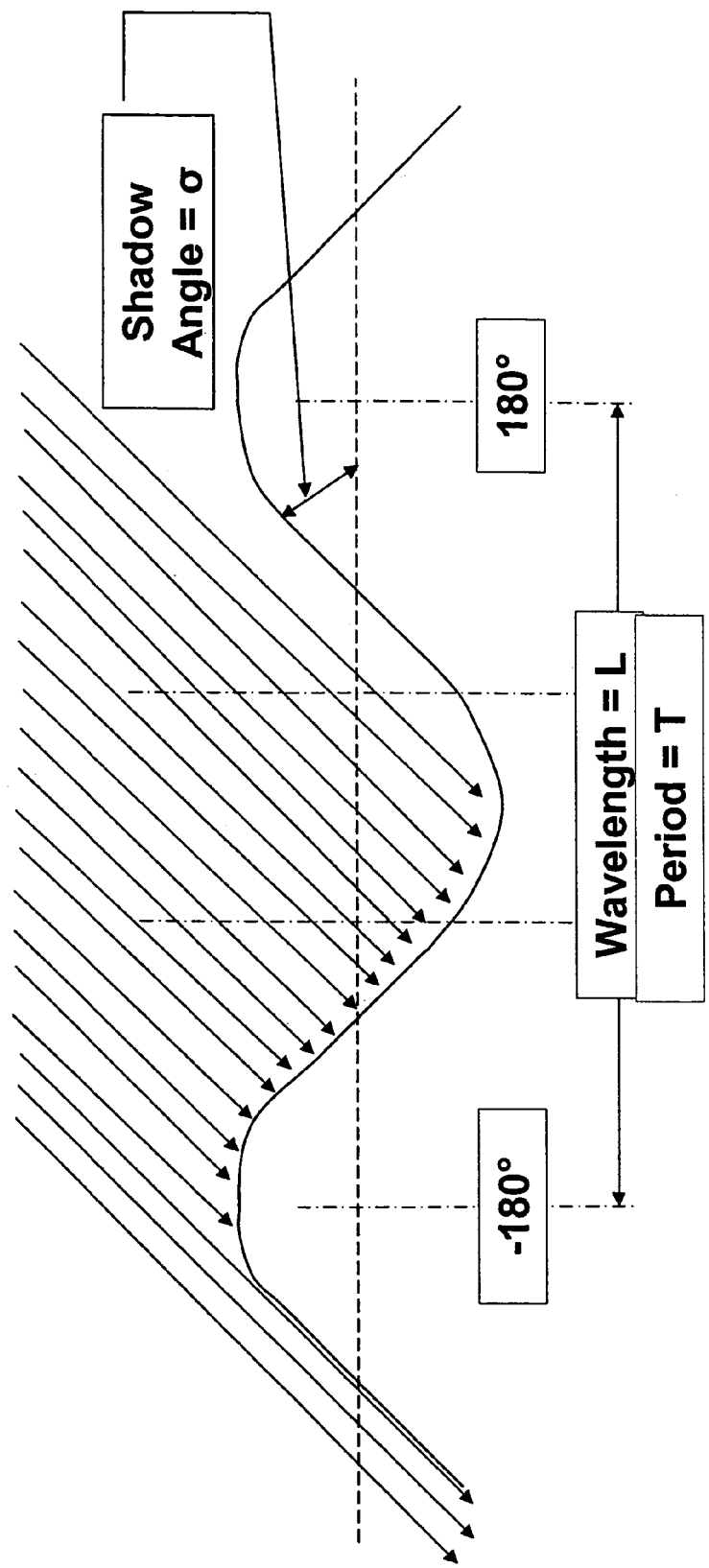
FIG. 3 depicts the shadow angle of a wave resulting from wave height and length.

As shown in FIG. 3, eliminating wave shadows requires that the angle of incidence be equal to or greater than the maximum slope of the wave generating the shadow. The shadow angle is designated by a lower-case sigma, σ.

Figure 4:
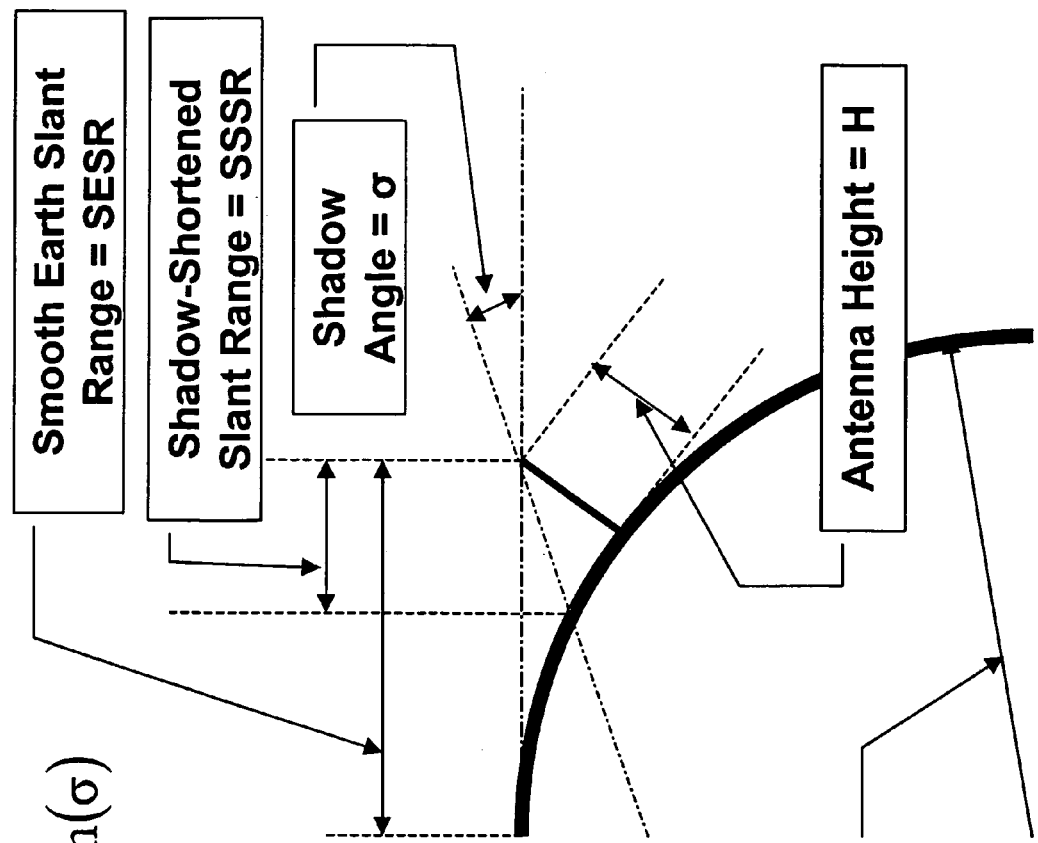
FIG. 4 depicts a smooth-earth slant-range and a shadow-shortened slant-range formula.

As depicted in FIG. 4, the smooth-earth slant-range formula expressed in English units translates into the "SESR" in miles is equal to the square root of two-times an antenna height as measured in feet. The formula for the shadow-shortened slant range is a function of the shadow angle and reduces to the more familiar expression when the shadow angle is equal to zero.

Figure 5:
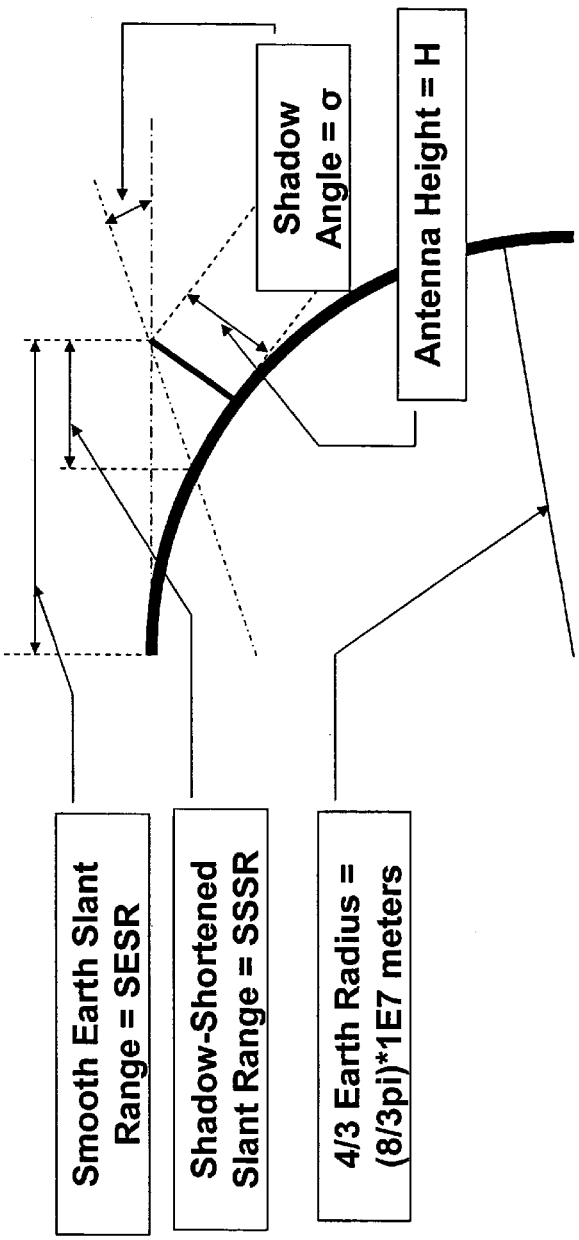
FIG. 5 is a table summarizing slant-range calculations for varying sea states.

The table of FIG. 5 summarizes the slant-range calculations for sea states 3, 4 and 5. The reader antenna is adjusted so that the shadow-shortened slant range is held constant at 2,500 meters, which is consistent with the assumed concept of operations, and the reader antenna height is computed for the required reader antenna height necessary to abate the effects of shadowing. The smooth earth slant range is computed using the same antenna height.

For sea state 4, the height of the reader antenna 12 needed to eliminate shadows at 2,500 meters is 246 meters, or nearly 10% of the slant range. The smooth earth slant range for an antenna at this height is nearly 65,000 meters. Thus, it appears to be impractical to attempt to overcome the effects of shadowing by raising an antenna. However, it can be deduced from FIG. 5 that a reader mounted on an airborne platform would have no difficulty overcoming wave shadowing even at sea state five.

Figure 6:
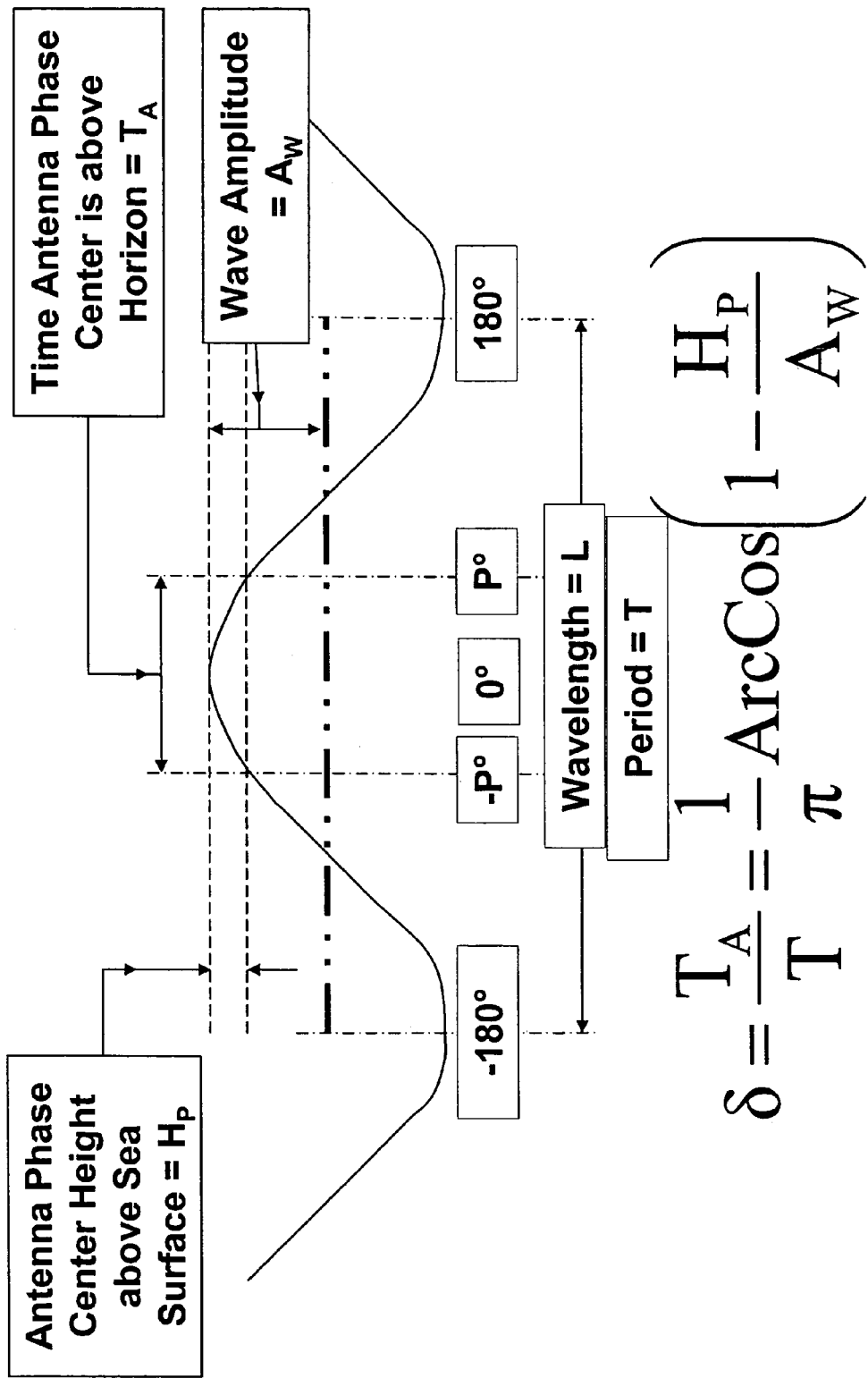
FIG. 6 depicts intervals that an antenna phase center is above the horizon.

As illustrated by FIG. 6, an alternative formulation may yield more practical results. Since the antenna 12 is assumed to be 3.5 meters above the water surface, the antenna is always above sea state four wave crests and mostly above sea state five wave crests. Further within an interval of one wave period, every sensor antenna crests at least once. The time that a modulator antenna phase center is above the horizon depends on the height of the antenna phase center, the amplitude of the wave and the period of the wave.

Although wave period and wave amplitude are not correlated, some estimates can be made about sea conditions at various sea states using tables of typical sea state variables. Wave period, wave length and wave velocity are related by the gravitational constant while wave amplitude depends on many local factors and is less predictable. Thus, the time between crests is very predictable while the amplitude of the crests is highly unpredictable.

Many other parameters affect performance of the system of the present invention; therefore, a system design may proceed along several variations. For the purpose of this disclosure, the transmitter power of the reader 10 is an independent variable and an exemplary design is developed that illustrates the disclosed method. Default values are assumed for other parameters, which are consistent with other objectives of at least one application of the present system and method.

The default values are based on an operation over an ocean surface at a frequency of about 3 GHz and with no element of the system extending more than one meter above the ocean surface. Further, it is assumed that the antennas used in the system are small and have capture areas of about 16 cm$^2$, which is consistent with a requirement for stealth operations. The equation for signal-to-noise ratio and a table of default values for independent variables is illustrated in FIG. 7.

Figure 8:
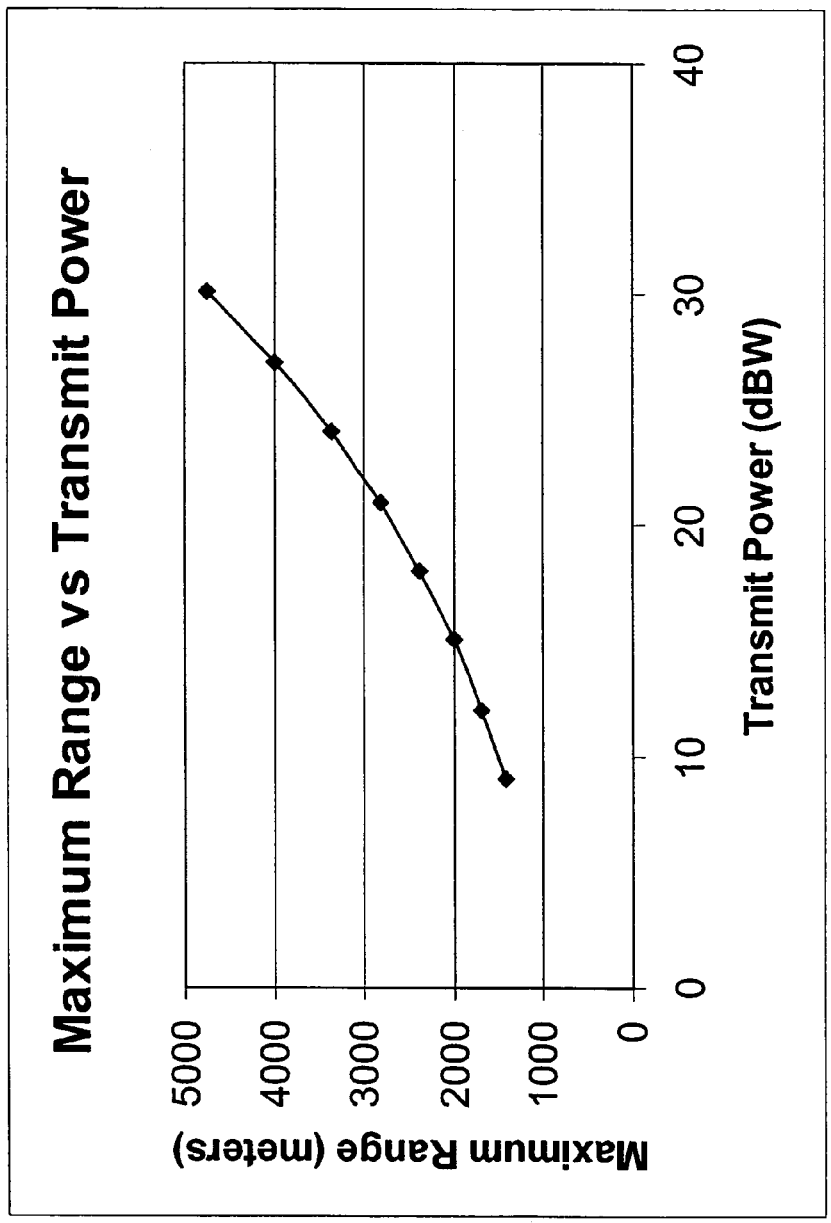
FIG. 8 is a graph depicting a reader transmit power to maximum range with the transmit power expressed in dB relative to one Watt while the range is expressed in meters.

The range threshold is the range at which the signal-to-noise ratio is equal to unity based on the default values and a specified value of the transmitter power, "p" of the reader 10. The threshold range is plotted in FIG. 8 as a function of the transmitter power of the reader 10 over a range of transmit powers. The transmit power is expressed in dB relative to one Watt while the range at which S/N=1 is in meters. The calculation extends from a transmitter peak power of approximately eight Watts, for which the maximum range is 1.4 kilometers, to a transmitter peak power of one kilowatt, for which the maximum range is about 5 kilometers.

In order to uniformly serve an extended area using a plurality of readers 10, it is necessary to design each reader with a "cell" so that the cells tessellate to uniformly fill the area. Each cell is made up of a plurality of identical hexagonal tiles where the central-most tile contains a reader 10 and a sensor 20 while all of the remaining tiles would contain only sensors.

Figure 9:
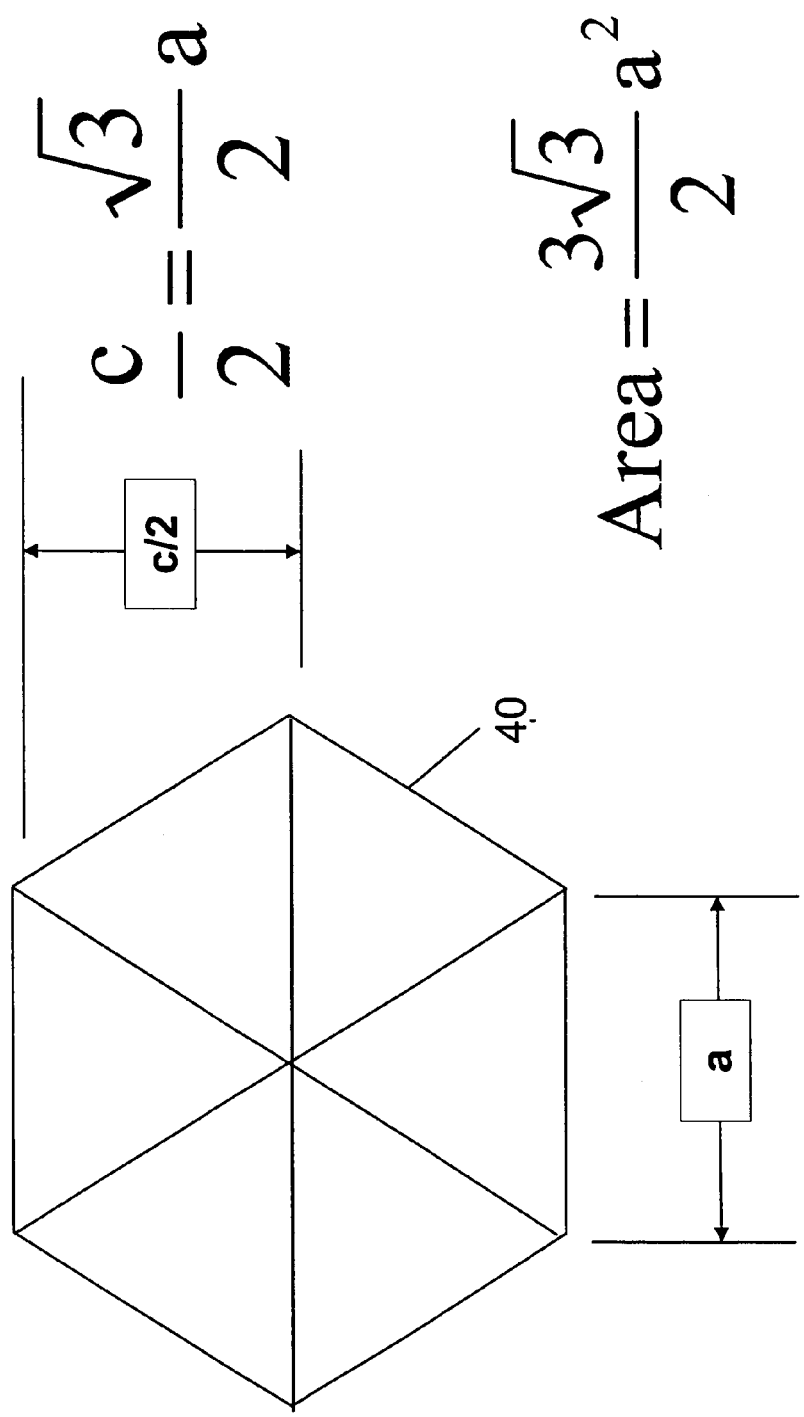
FIG. 9 depicts a tile area comprising six equilateral triangles with sides of equal size.

A typical hexagonal tile 40 is represented in FIG. 9. Each tile 40 contains a single reader 10 and sensor or a single sensor 20. Each tile 40 is defined by a single dimension, "a", which represents the length of each side of the hexagon and the distance from each corner to the center of the hexagon. When the tiles 40 are placed side by side, then the minimum distance, "c", is measured between the adjacent centers of two tiles, which is defined in FIG. 9 as twice the distance from a midpoint of an edge to the center of the hexagonal tile. A minimum separation occurs when the sides of adjacent tiles are aligned.

Figure 10:
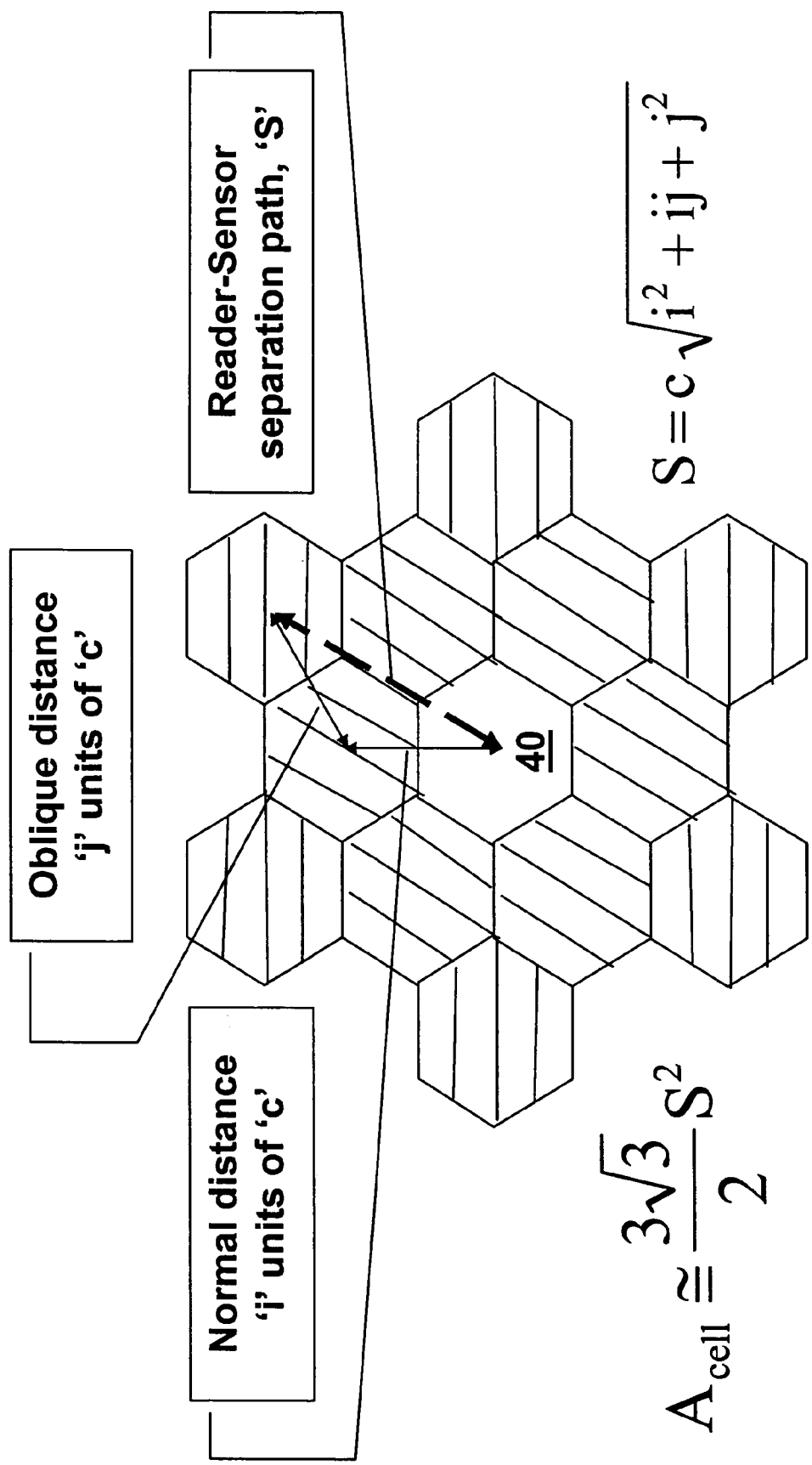
FIG. 10 depicts a cell of order 1 comprising one reader/sensor tile and twelve surrounding sensor tiles.

A cell comprising thirteen hexagonal tiles is depicted in FIG. 10. The center-most tile 40 contains a sensor 20 and a reader 10 while the remaining twelve tiles contain only sensors. The reader-to-sensor separation path, "S", between the reader 10 and the sensor 20 in any cell comprising a number of hexagonal tiles is computed as the sum of two vectors. One vector proceeds from the center of the reader/sensor tile to the center of any other tile by first traversing along a normal distance of "i" tiles and then along an oblique distance of 'j' tiles. The separation path, "S", is then computed as the magnitude of the vector sum of the two traverses. The general equation for computing "S" for any cell is also given in FIG. 10. For the cell illustrated in FIG. 10, the largest value for "S" occurs when i=1 and j=1 so $S_{MAX} = c\sqrt{3}$.

Figure 11:
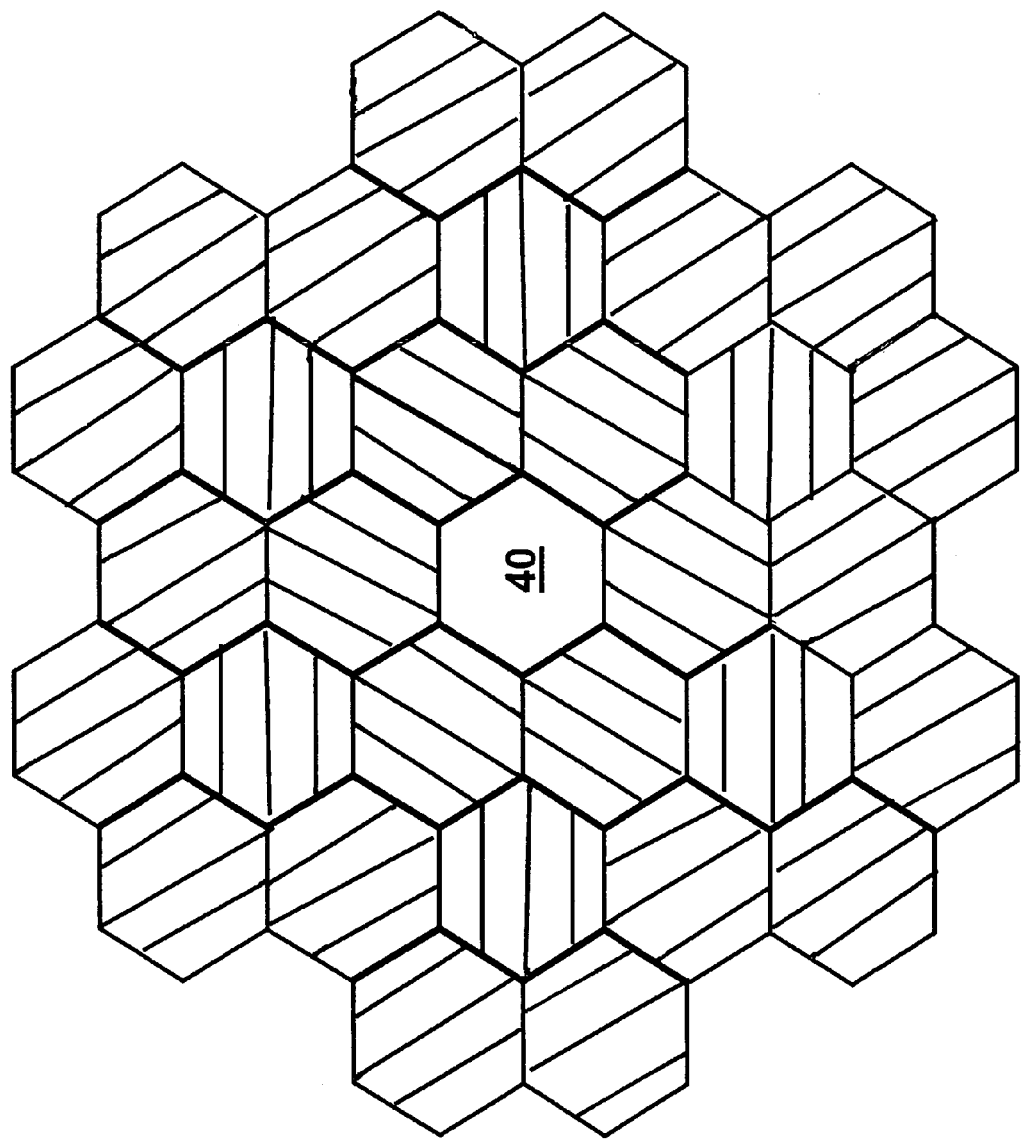
FIG. 11 depicts a cell of order 2 comprising one reader/sensor tile and 30 surrounding sensor tiles.
Figure 12:
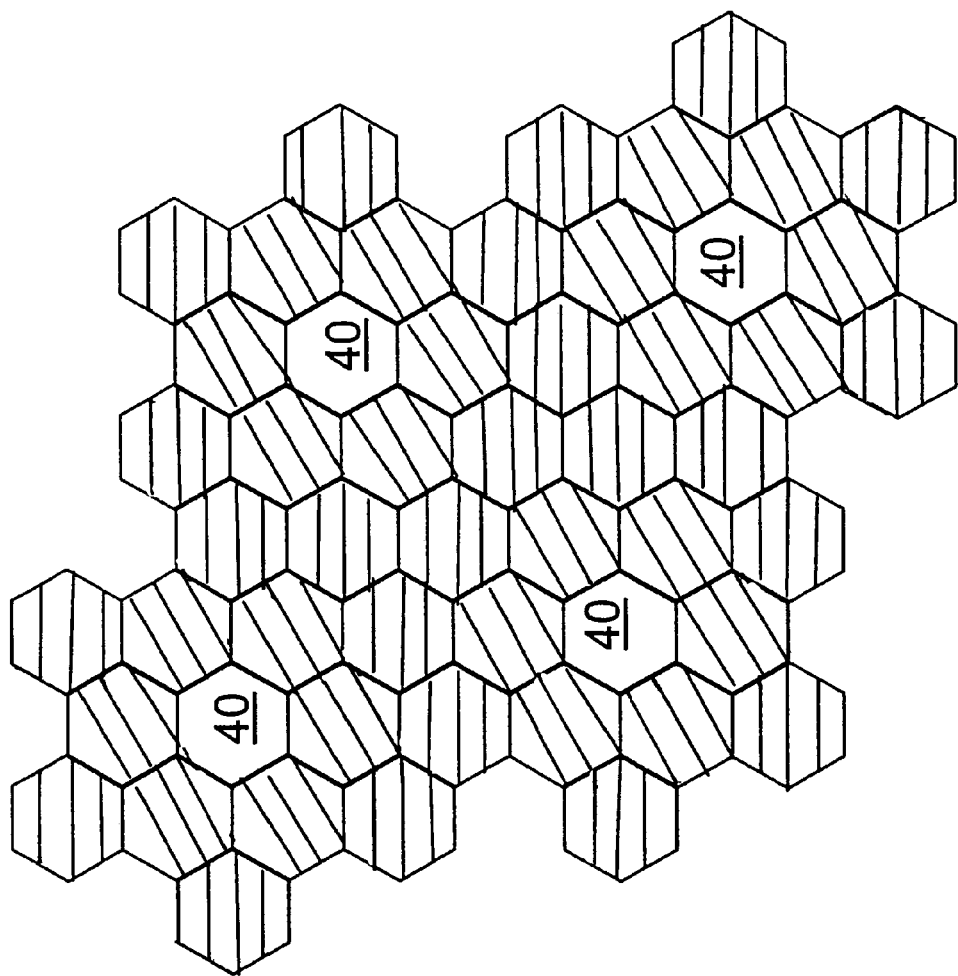
FIG. 12 depicts a tessellation of four order 1 cells containing four reader/sensor cells and 48 surrounding sensor tiles.

The order of a cell, I, is equal to the number of tiles in the maximum normal path. I=1 for the cell in FIG. 10. A cell of order two, I=2, is illustrated in FIG. 11. In FIG. 12, a tessellation of four order 1 cells is illustrated. Cells of any order will tessellate in this manner; thereby, providing uniform coverage of a large contiguous area.

The number of tiles, N, in a cell of order I is obtained by solving by the equation:

$$N = 3I^2 + 9I + 1. \tag{5}$$

Further, the maximum separation in a cell of order I is given by $$S_{MAX} = c\sqrt{I^2 + I + 1} \tag{6}$$

and the area of a single tile is given by $$A_{tile} = \frac{\sqrt{3}}{2}c^2. \tag{7}$$

Since the area of a cell is N times the area of a tile, the area of a cell of order I is computed by combining Equations (5)-(7), using Equation (6) in order to express the cell area in terms of the reader-to-sensor separation path, "S". The result is $$A_{cell} = S^2 \frac{\sqrt{3}}{2} \frac{3I^2 + 9I + 1}{I^2 + I + 1}. \tag{8}$$

If it is assumed that I>3, then approximation of the cell area is given by $$A_{cell} = \frac{3\sqrt{3}}{2}S^2. \tag{9}$$

Figure 13:
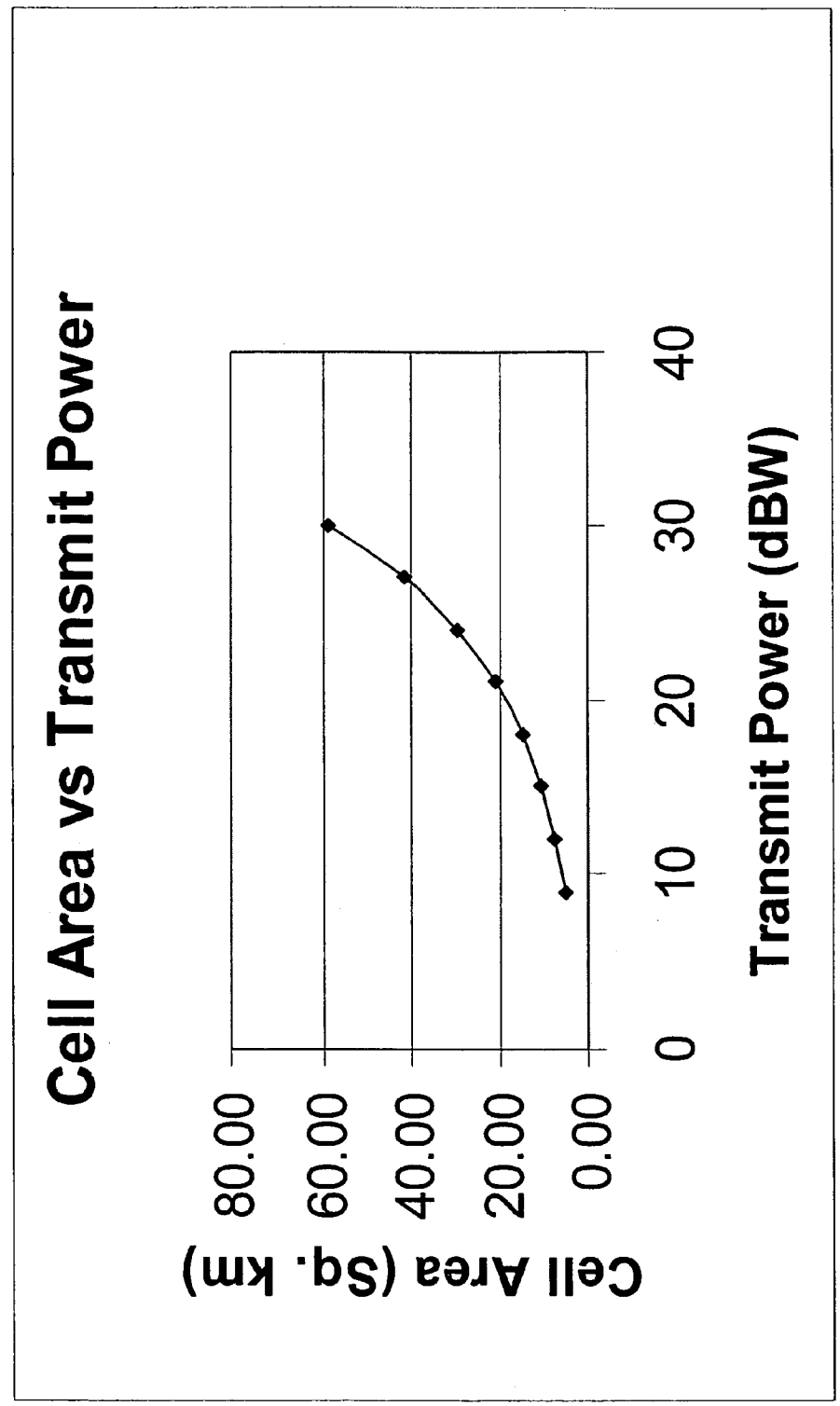
FIG. 13 is a graph depicting a cell area served by a single reader plotted as a function of a transmit power with the transmit power expressed in dB relative to one Watt while the cell area is expressed in square kilometers.

The cell area predicted by Equation (9) is plotted in FIG. 13 as a function of reader transmitter power. A reader transmitter peak power of about 100 Watts can serve a cell with an area of approximately 20 km² while a peak power of one kilowatt will serve a cell with an area of approximately 60 km².

Figure 14:
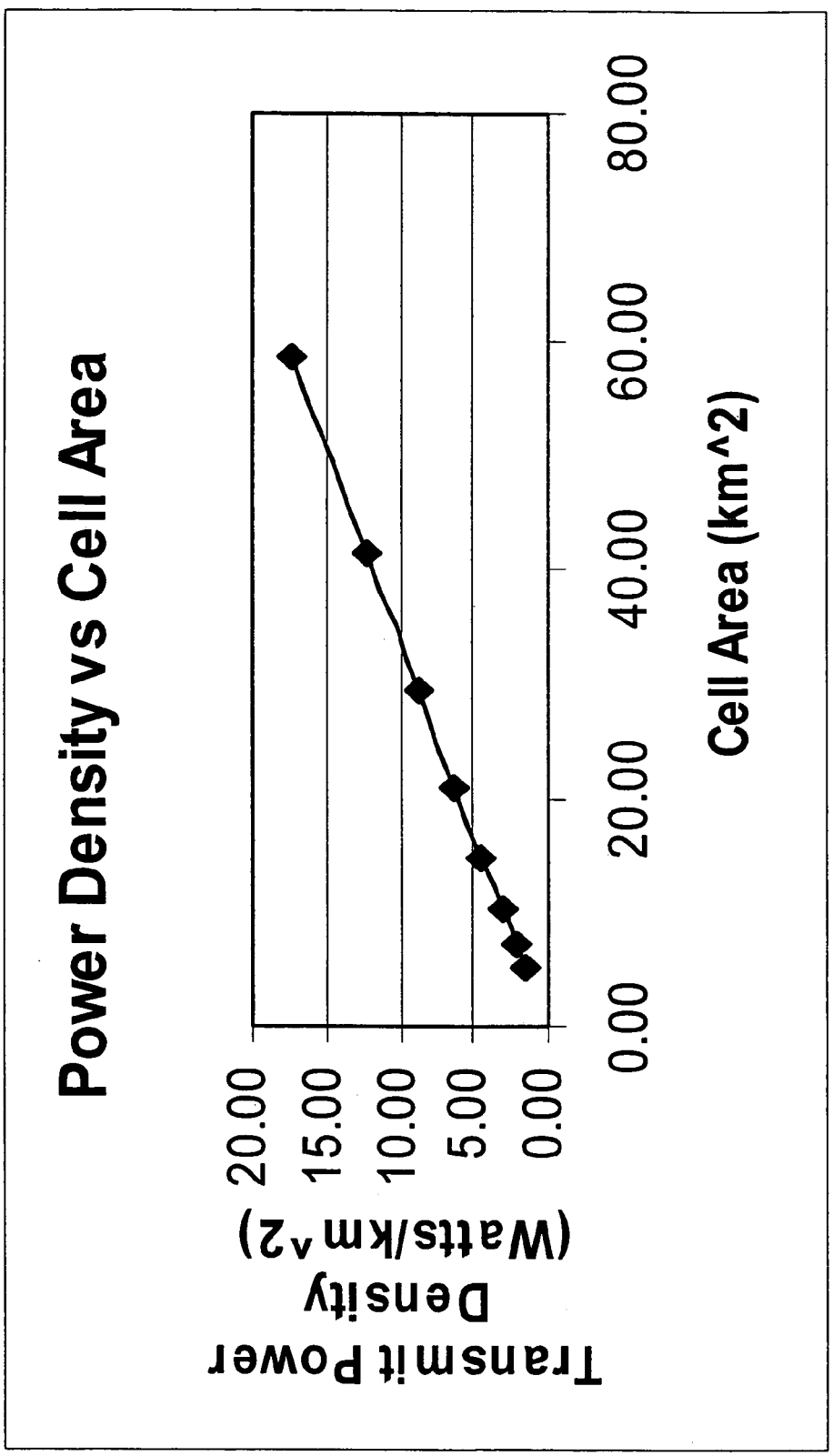
FIG. 14 is a graph depicting transmit power density of the reader increasing in relation to cell area.

If the total transmit power is divided by the cell area, the power density is obtained as a function of cell area (See FIG. 14). As shown in the figure, the power density increases almost linearly with cell area. For a given area, the minimum total power required to serve the entire area would occur with the smallest cell size. Conversely, the number of readers 10 increases as cell size is reduced. More of the readers 10, each with lower power, are then required.

Since the cost of the reader 10 is a positive function of the required transmitter power, which increases with cell size, and since the required number of readers decreases with cell size there will be an optimum cell size that minimizes the total cost to provide service for a given large area. The optimum cell size is determined when all the parameters are known.

The maximum number of cells that can be served by a single reader 10 is determined by the architecture of the reader, the data-channel bandwidth, the stability of the modulation circuitry of the sensor 20, and other parameters of the system. In some operations, the number of cells served by a single reader 10 can number more than a thousand.

For the purposes of illustration of this architecture, a reader 10 located at the center of a cell transmits a 20-Watt radially-symmetric continuous wave (CW) signal, which is reflection modulated by readable remote sensors 20 scattered over the cell area. It is assumed that the sensors 20 are uniformly distributed over the cell area. For I=10 in Equation (5), N=391 (three hundred and ninety sensor tiles and one reader tile) and each tile would cover an area of about 0.05 square kilometers. Then, from Equation (7), the mean spacing between adjacent sensors would be approximately 243 meters. From Equation (6), the maximum reader sensor separation is 2,560 meters, which will require a transmitter height of at least 0.41 meters, according to Equation (4). The latter calculation assumes a smooth ocean surface and does not account for additional height required in order to accommodate operation in a different sea state.

Again, for the purpose of this example, the reader 10 is fixed in location within an area that has been uniformly saturated with the sensors 20 having a mean separation of 243 meters so that, at any given time, approximately the three hundred and ninety sensors will be located in the 20 km$^2$ cell surrounding the reader.

It is further postulated that thousands of the sensors 20 have been deployed into the area and are drifting through the reader cell so that, on average, there are about three hundred and ninety sensors in the cell. Thus, it is necessary to formulate an addressing scheme that will allow the reader 10 to discriminate the three hundred and ninety sensors 20 in the cell of the reader at any given time. Because of the necessity to deploy thousands of the sensors 20 over a wide area without regard to which cell each sensor falls into; the addressing scheme functions independent of any prior knowledge about which cell a sensor is located in. Other solutions, which may be more efficient or offer other advantages in certain situations, may be considered as extensions or modifications of the disclosed scheme.

The exemplary addressing scheme is frequency-division multiplexing based on a random frequency assignment plan. Each sensor 20 is assigned a specific modulation frequency selected at random from a group of "M" possible modulation frequencies. Each reader 10 uses a frequency-partitioning filter to separate the M modulation frequencies into M unique channels. The number of modulation frequencies, M, is assumed to be much larger, 4096 in this scenario, than the number of sensors in a cell at any given time, three hundred and ninety in this scenario.

Frequency partitioning works well when the number of frequency partitions is a power of 2. If it is assumed that M=4096, then the probability that the sensor 20 has been assigned a particular frequency is (1/M)=(1/4096).

In a problem scenario, if two of the sensors 20 in a cell are operating at the same modulation frequency, discrimination may not be possible and data from one or both cells may be lost. However, the channel signal-to-noise ratio is dependent on the fourth power of the reader-to-sensor range so that a frequency collision will almost surely result in detection of the closest sensor 20. Since the probability of a frequency collision is highest for two sensors, it is reasonable to assume that the number of sensors lost as a result of frequency collisions is equal to the number of collisions. If the sensors 20 are allowed to randomly select a new modulation frequency after each transmission, then the likelihood of the same sensor being involved in a frequency collision on successive transmissions is diminished, provided only that M>>N.

Figure 15:
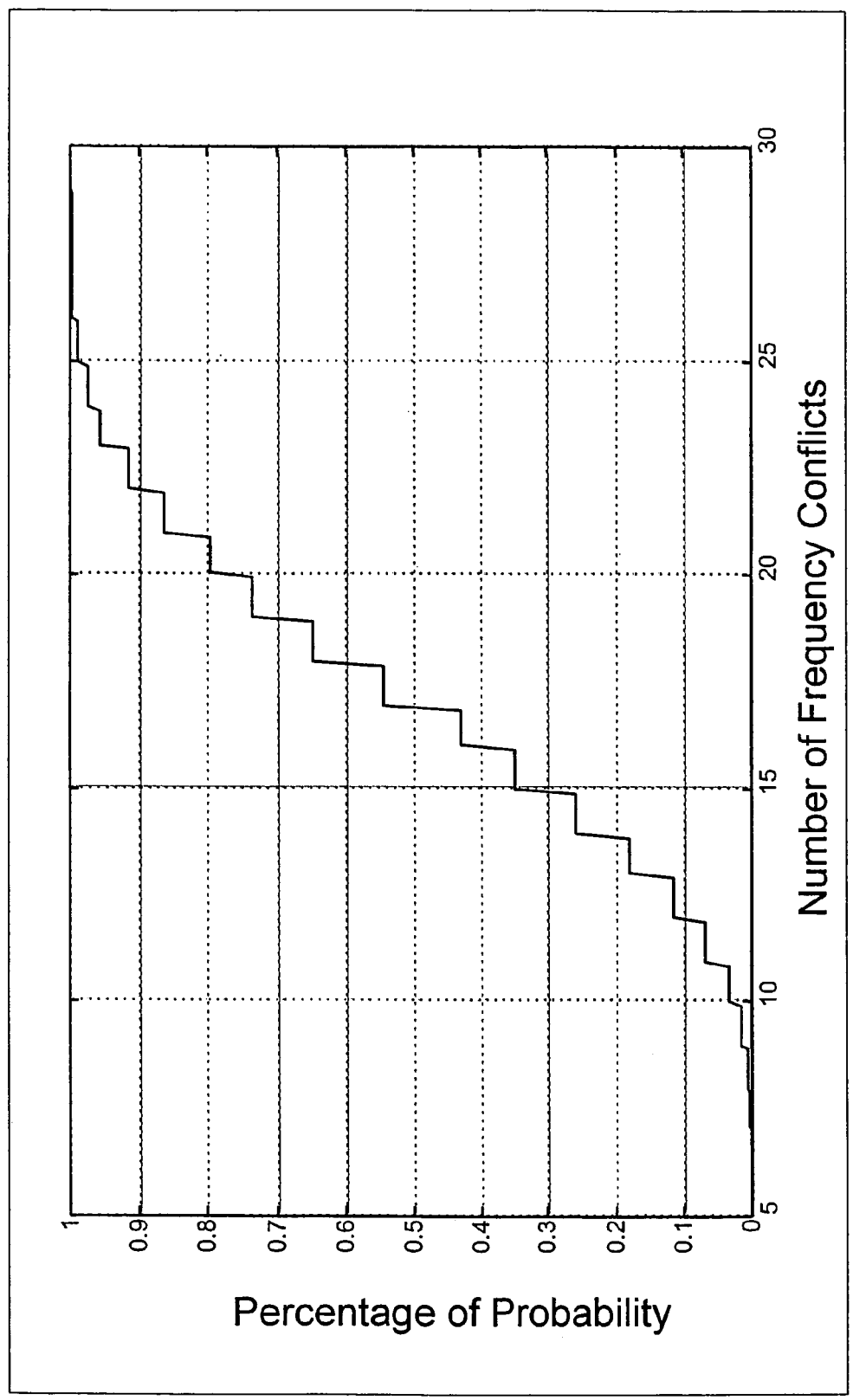
FIG. 15 is a graph depicting the probability that the number of frequency conflicts is less than a specified number.

The expected value of the number of frequency conflicts can be predicted using a Monte Carlo method wherein a population of "N" sensors is assigned modulation frequencies at random from a population of "M" frequency choices; the number of conflicts is recorded; and the experiment is repeated many times until the conflict expected-value distribution begins to take shape (See FIG. 15). In FIG. 15 is plotted the probability that the number of collisions in a given experiment is less than the ordinate. The probability distribution in the figure is based on the number of frequency choices, M (4096 in this scenario), and the number of sensors in a cell (three hundred and ninety in this scenario). Thus, in this scenario, there is 50% probability that the number of frequency collisions in a given experiment will be less than 17. In general, within a group of N sensors that have been assigned frequencies at random from a group of M frequencies, the probability of a frequency conflict is [N!/(N−2)!(2)!]/M.

Figure 16:
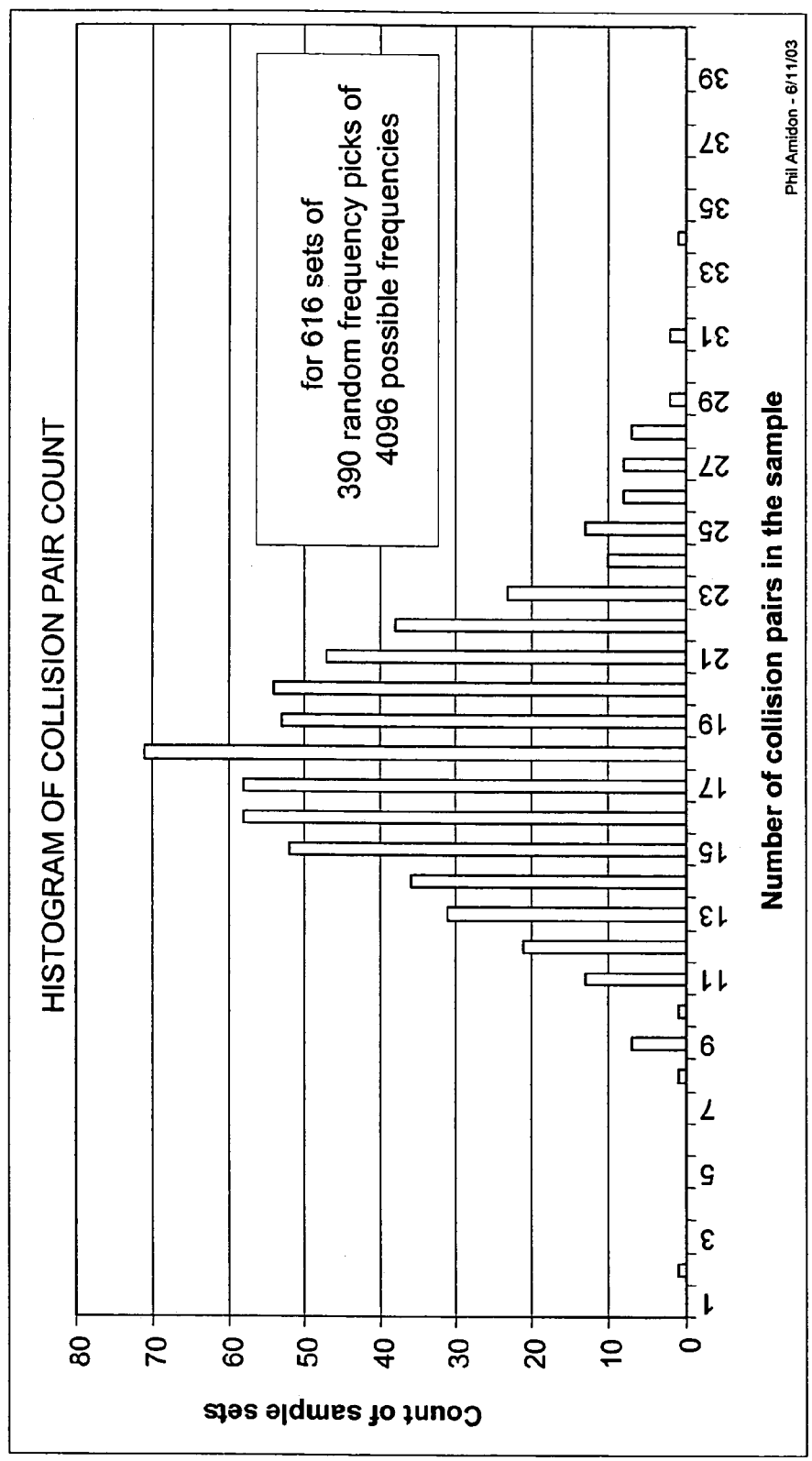
FIG. 16 is a histogram depicting the expected value of a given number of frequency conflicts in a cell with a population of three hundred and ninety sensors that have been assigned frequencies at random from a group of 4096 frequencies.

FIG. 16 illustrates a Monte-Carlo derived histogram of the number of frequency conflicts observed in 616 experiments involving a random distribution of 4096 frequencies among 390 sensors. The raised-cosine shape of the expected value curve is easily discernible in the figure and there is general agreement with the probability distribution plotted in FIG. 15. Thus, each time the reader attempts to recover sensor data packets, the expected value of the number of sensors whose data is lost because of a frequency conflict is approximately 17, or a little less than 5% of the total, which is within an acceptable range for the application. This calculation assumes that the capture properties of a receiver subsystem 14 of the reader 10, together with the range differences in a cell, are such that only one sensor signal is lost if a conflict occurs. Other multiplexing/addressing schemes may offer a higher than 95% probability of success. However, demonstrating that at least one scheme has a predictable success rate of 95% proves the viability of the scheme.

In order to simplify the description of the operation of the receiver subsystem 14, the operation of several common radio-frequency system components are reviewed for the characteristics that are needed for the architecture of the receiver subsystem.

Figure 17:
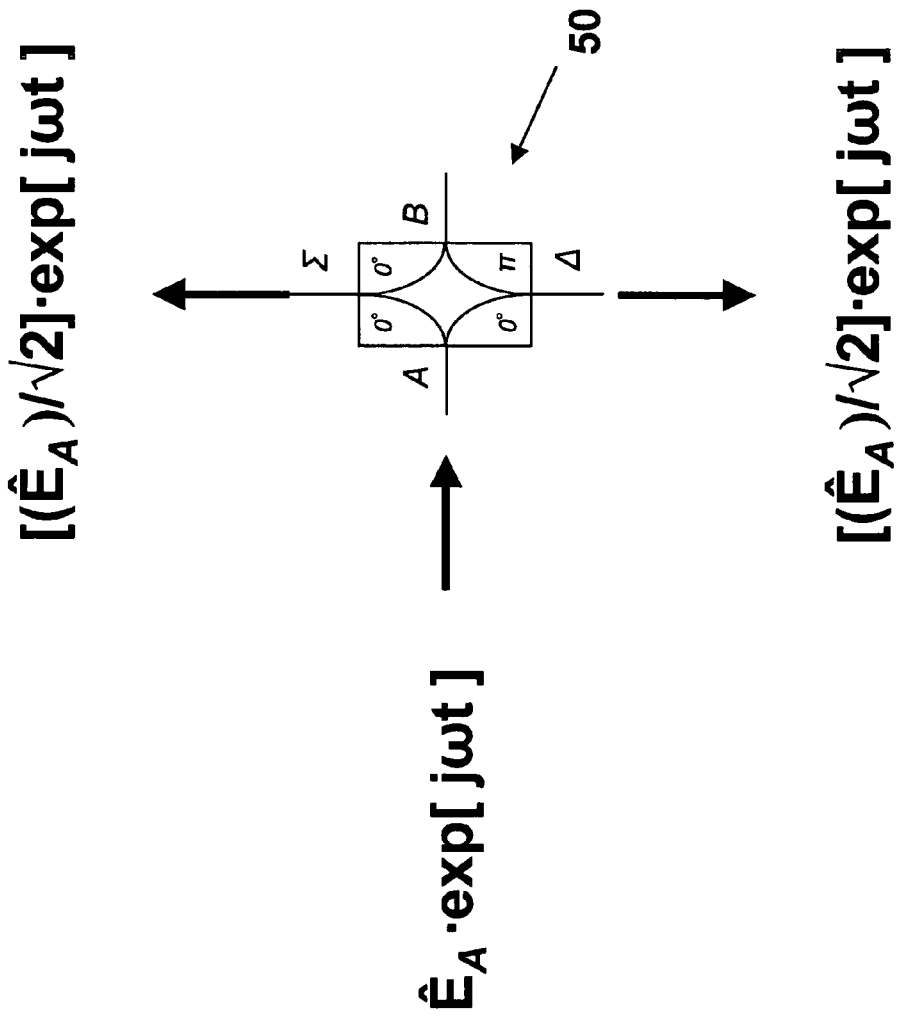
FIG. 17 depicts a signal hybrid with A-port input.

In FIG. 17, a signal hybrid 50 is illustrated. Early analog telephones used hybrids to separate received signals from transmitted signals. The signal hybrid 50 is a four-port device with two signals ports, 'A' and 'B', isolated from each other, a sum-port, and a difference-port. In the figure, a signal entering the A-port is evenly power divided between the sum-port and the difference-port. The phase of the sum-port signal is the same as the phase of the difference-port signal.

Figure 18:
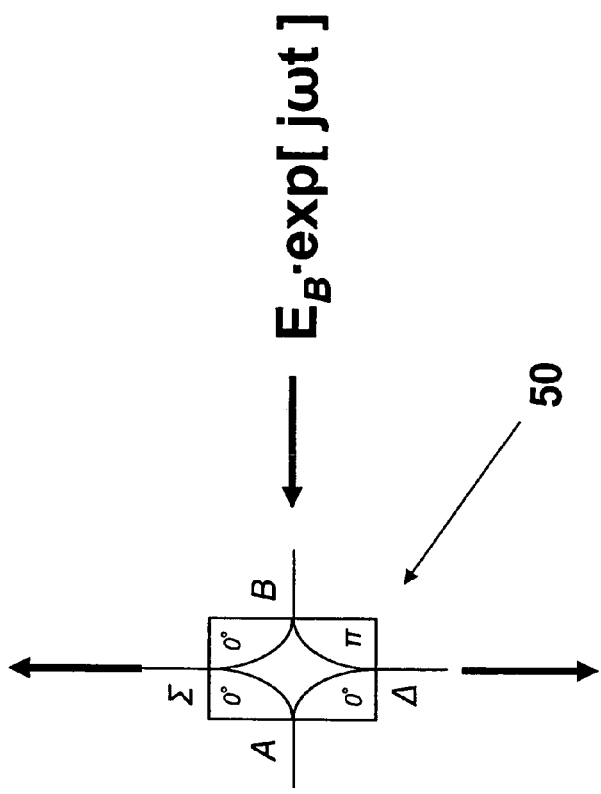
FIG. 18 depicts a signal hybrid with B-port input.
Figure 19:
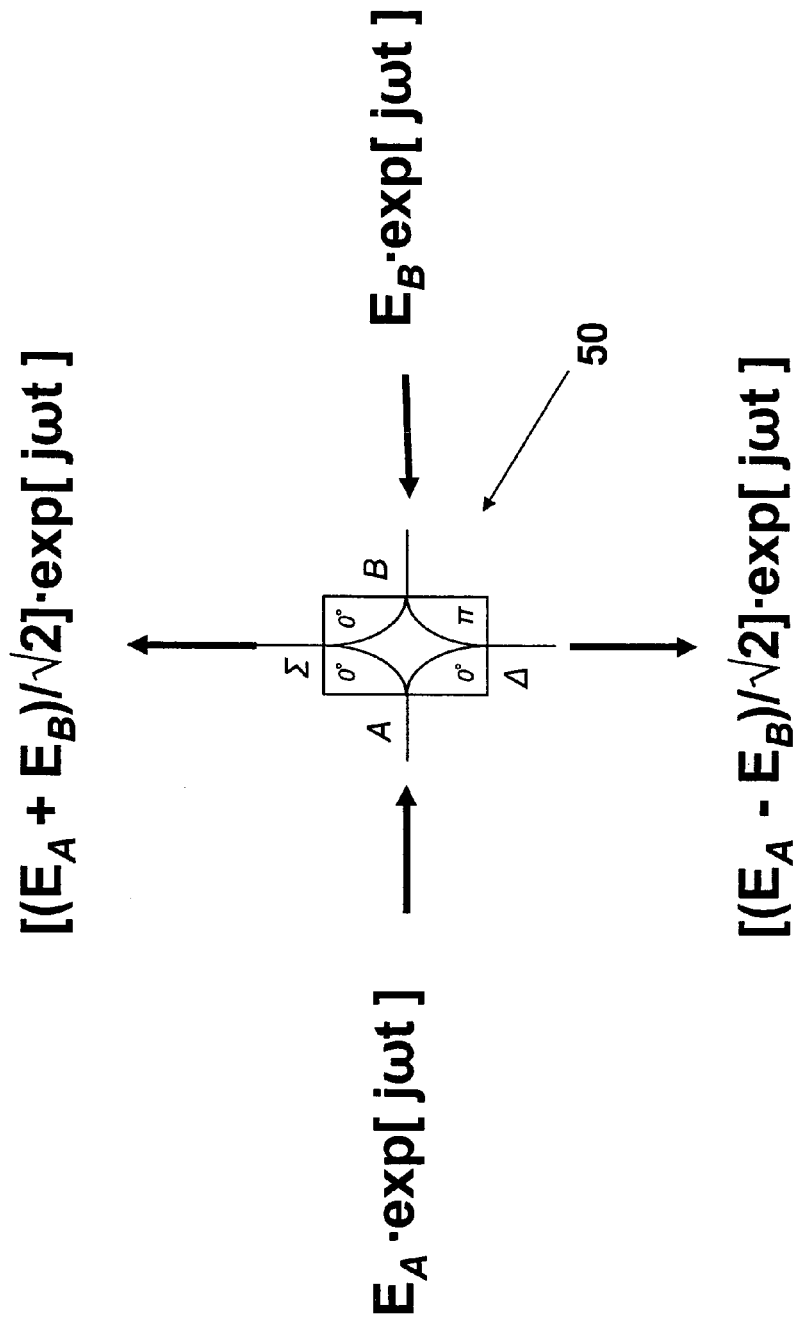
FIG. 19 depicts a signal hybrid with A-port input and B-port input with the signal at the sum-port being the vector sum of the two signals while the signal appearing at the difference-port is the vector difference of the two inputs.
Figure 20:
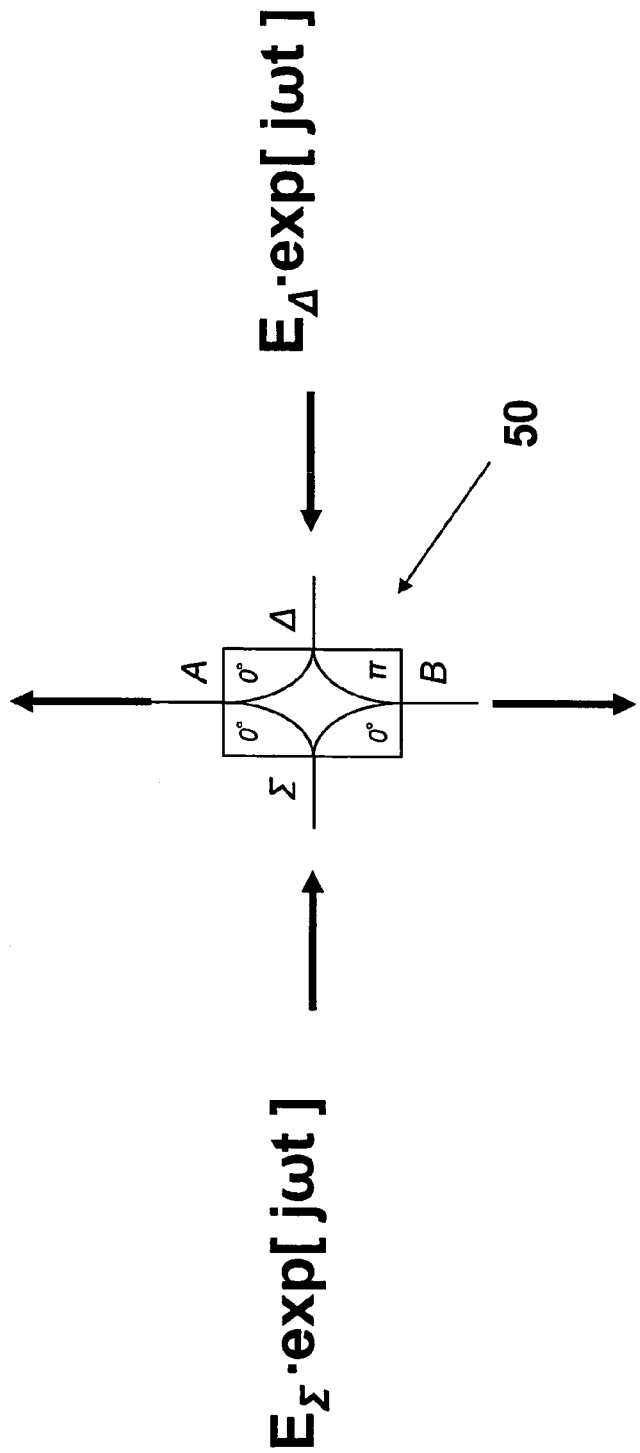
FIG. 20 depicts a signal hybrid with Σ-port input and Δ-port input interchanged with the A-port and the B-port as appearing in FIG. 19.

In FIG. 18, a signal enters the B-port of the signal hybrid 50 and is evenly power divided between the sum-port and the difference-port but the phase of the sum-port signal is different from the phase of the difference-port signal by 180 degrees. In FIG. 19, the signal appearing at the sum-port is the vector sum of the A-port signal and the B-port signal while the signal appearing at the difference-port is the vector difference of the A-port signal and the B-port signal. Lastly, a passive hybrid is a reciprocal circuit so that the sum and difference ports can be interchanged with the A and B ports (See FIG. 20).

Figure 21:
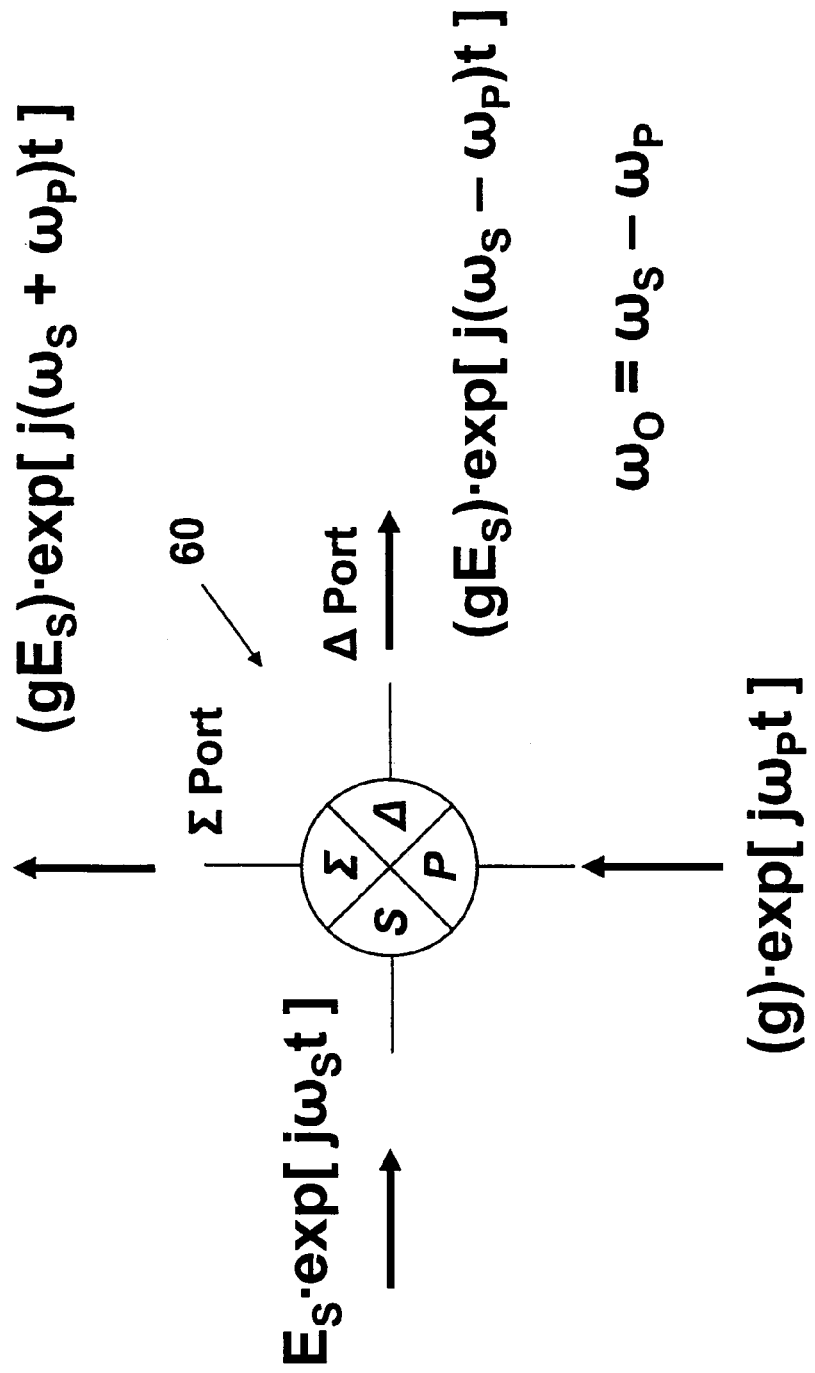
FIG. 21 depicts a frequency translator.

In FIG. 21, a frequency translator 60 is illustrated. The frequency translator 60 is often called a "mixer". The frequency translator 60 is a four port device with a signal input 'S', a pump input, 'P', a sum output, 'Σ', and a difference output, 'Δ'. The pump input is so named because early mixers used nonlinear devices that were driven (or pumped) by a local oscillator signal at the translation frequency. Modern digital circuits that perform the frequency-translation function still adhere to the historical nomenclature and may still be called mixers. Frequency translation is effected by periodically reversing the phase of the input signal at a rate equal to the translation frequency. The operation is essentially the same as multiplying the input signal by a unit-magnitude square wave at the pump frequency. The process creates the two desired outputs, each having a voltage magnitude of about (2/pi) times the input signal amplitude. Many other mixing-product are also generated but these weaker signals frequencies are usually terminated inside the frequency-translator circuits, which results in a small loss of signal power in the translator circuit. The minimum loss of a broad-band frequency converter is 3.92 dB to the sum port and 3.92 dB to the difference port.

Figure 22:
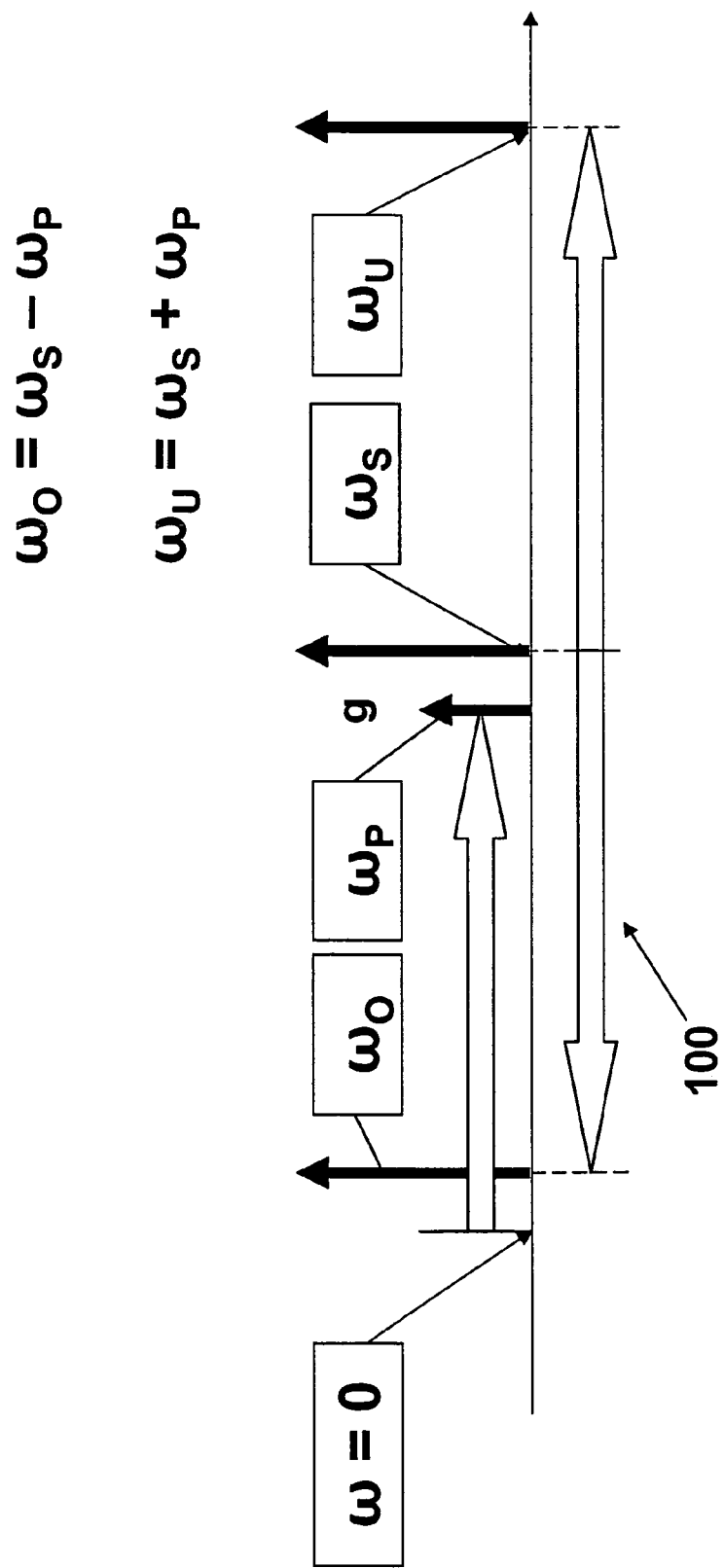
FIG. 22 depicts a frequency translation property.

The frequency-translation property is depicted in FIG. 22. Following a convention, each frequency of interest is indicated on a frequency axis by a labeled vertical arrow. The translating frequency, $\omega_P$, defines the length of the translating vector 100 by its distance from the origin. The signal frequency, $\omega_S$, again by convention, is greater than the translating frequency, $\omega_P$, by an amount equal to the principal output frequency, $\omega_O$. The two frequencies, $\omega_O$ and $\omega_U$, are below and above the signal frequency, $\omega_S$, by an amount equal to the length of the translating vector 100.

Figure 23:
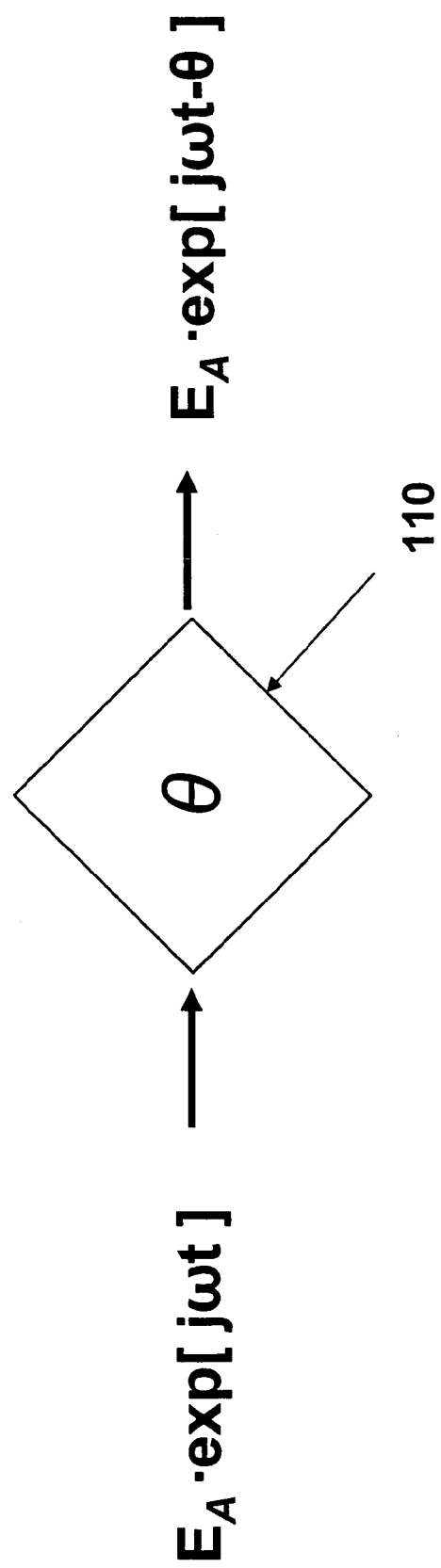
FIG. 23 depicts a phase shifter which changes the phase of signal by a specified amount.

In FIG. 23, a phase shifter 110 is depicted. The passive phase shifter 110 retards the phase of an incident signal by a fixed amount. A time delay is one embodiment of the phase shifter 110 that can be implemented in both analog and digital circuits. The icon for the phase shifter 110 indicates the amount of phase retardation introduced by the module.

Figure 24:
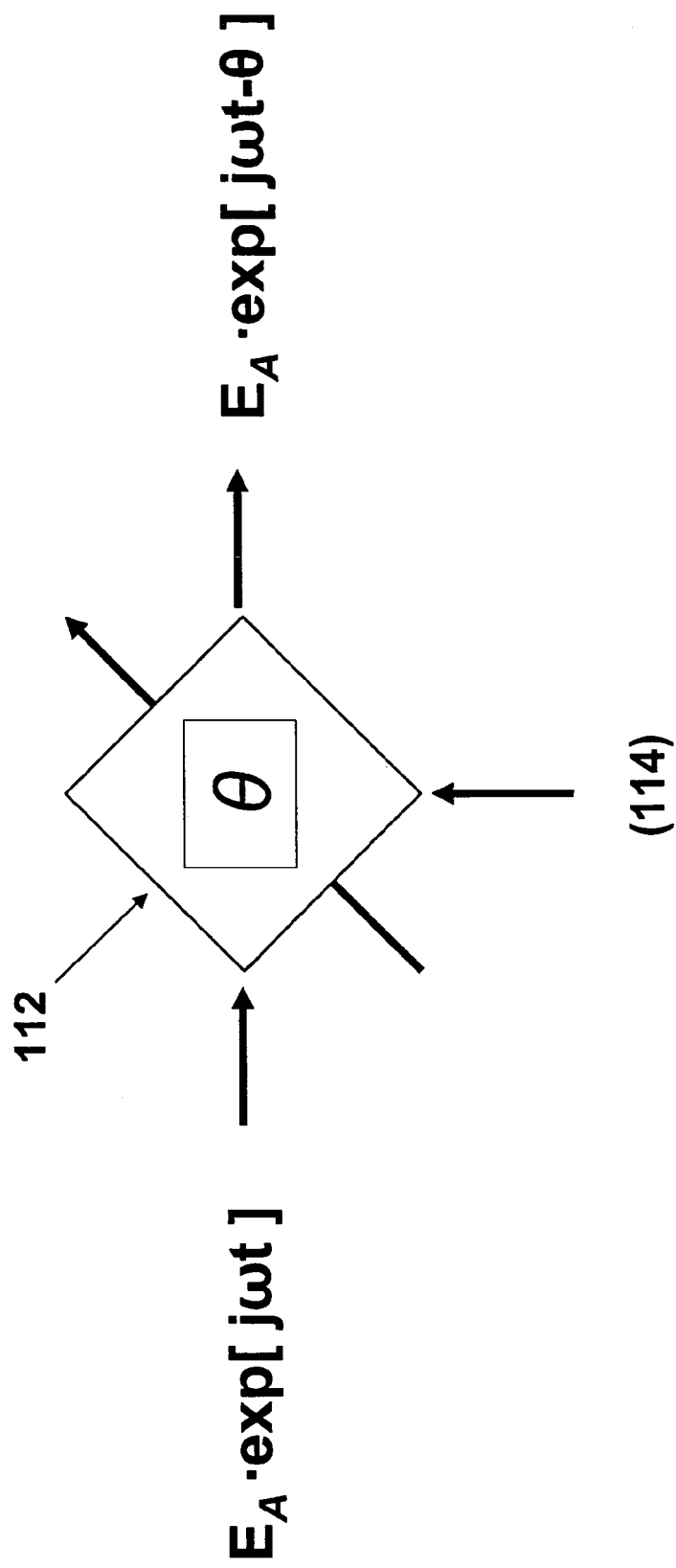
FIG. 24 depicts a controlled phase shifter which changes the phase of a signal by an amount that is dependent on a control parameter.

In FIG. 24, a variable phase shifter 112 that is controlled by a parameter is illustrated. For this module, the amount of phase retardation is determined by the control parameter (114).

Figure 25:
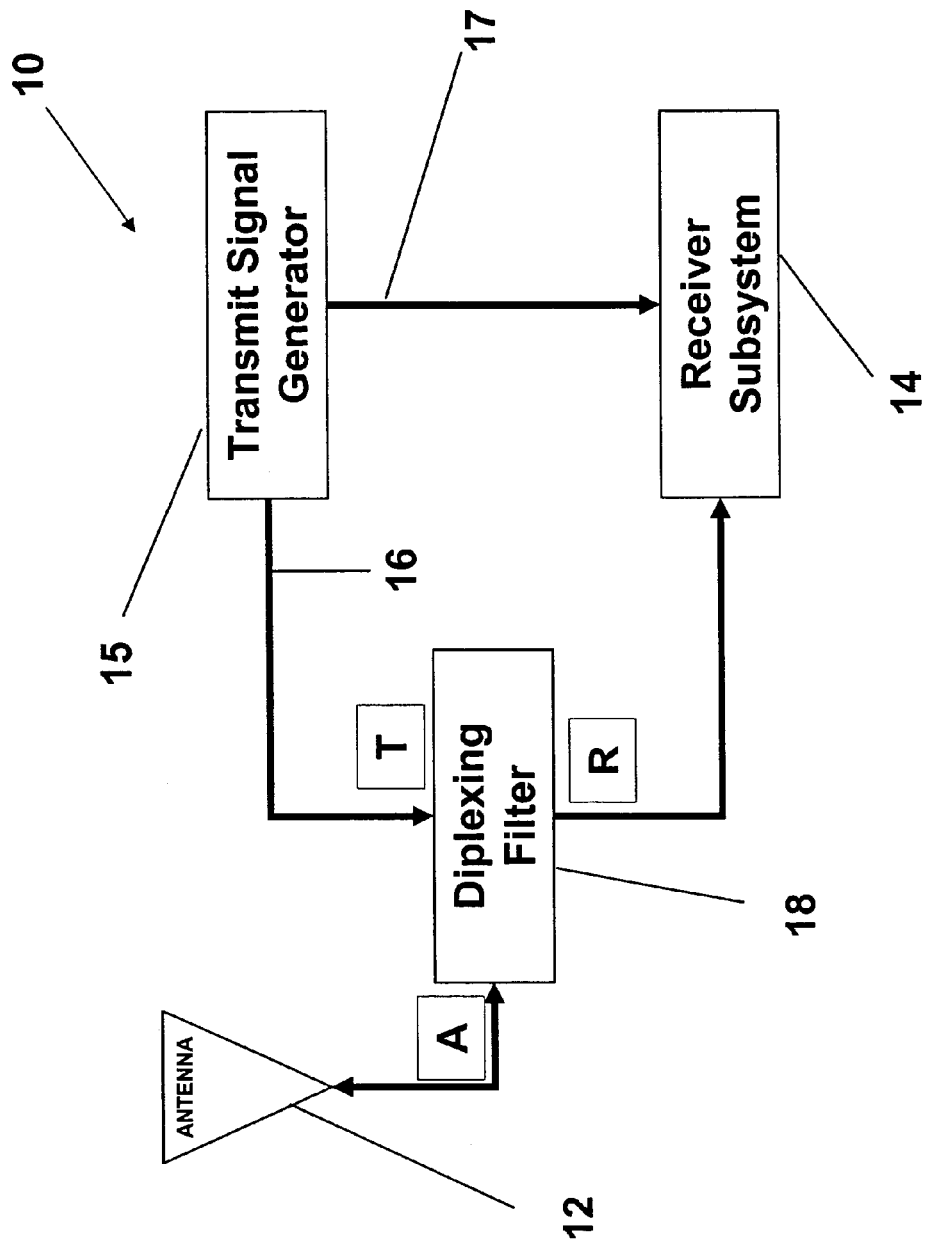
FIG. 25 depicts a transmit signal generator and receiver subsystem sharing the same antenna as part of the reader where a diplexing filter separates the transmit signal from the receiving signal.

The transceiver system for the reader 10 is illustrated in FIG. 25 in which the receiver subsystem 14 shares the antenna 12 with a transmit subsystem 15. Transmit signal reflection bi-phase modulation by the sensors 20 in the field of the view of the reader 10 causes the receive signals sidebands to be frequency translated up (sum) and down (difference) by an amount equal to the modulation frequency, which acts like a pump. For the purposes of this disclosure, it is assumed that the transmit signal is a CW signal whereas in actual practice, the transmit signal will most likely be a random frequency-hopped signal. A transmit signal 16 is produced by the transmit signal generator 15. A replica 17 of the transmit signal 16 is provided to the receiver subsystem 14 in order to recover the modulation sidebands produced by the sensors 20.

The reader 10 includes a diplexing filter 18 having three ports labeled "T", "A", and "R" which refer respectively to the actions of the transmit signal generator 15, the antenna 12, and the receiver subsystem 14. The transmit signal generator 15 is connected to the T-port, the antenna 12 is connected to the A-port, and the receiver subsystem 14 is connected to the R-port.

The diplexing filter 18 in FIG. 25 is defined by pass bands and stop bands in the frequency domain. The frequency band(s) identified for the transmit signal(s) cannot overlap the frequency band(s) identified for the receive signal(s). Thus, the T and R ports are isolated from each other by a stop band that extends over all frequencies used by the system for transmitting or receiving. Transmit signals entering the T-port are directed to the A-port with low loss while received signals entering the A-port are passed to the R-port with low loss.

Figure 26:
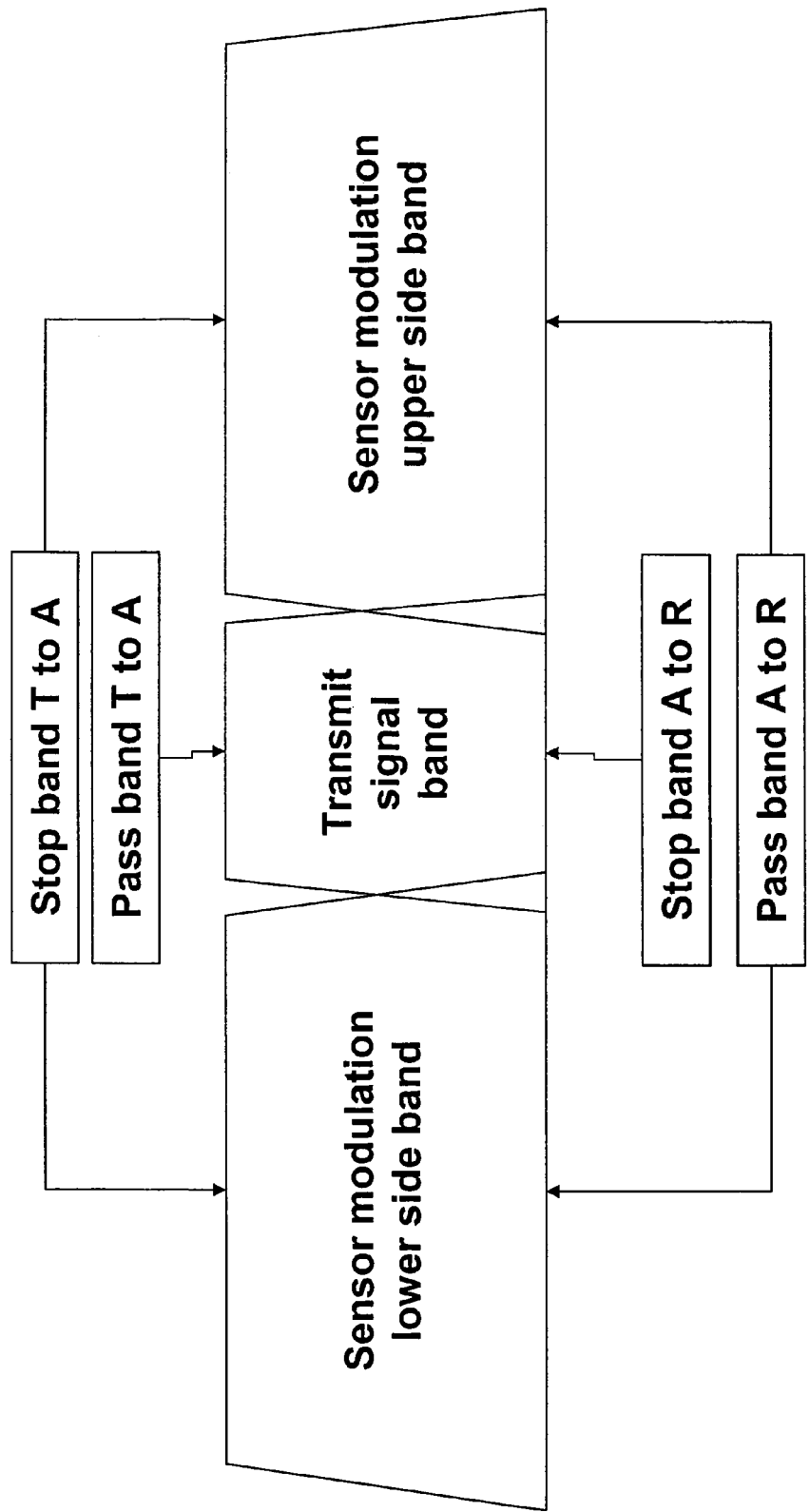
FIG. 26 depicts a diplexing filter separating the transmit signal from the receive signals using a low-pass, band-pass, high-pass configuration.

Diplexing filters are common system components known to those skilled in the art. However, the diplexing filter 18 is unique in that it has two receive pass bands separated by a transmit pass band in a low-pass, band-pass, high-pass realization. The required diplexing-filter frequency pass bands and stop bands are depicted in FIG. 26. The frequency characteristics of the diplexing filter 18 are undefined outside the bands of interest illustrated in the figure. In the disclosed embodiment, the upper and lower modulation sideband frequency bandwidth are each about 125 MHz while the transmit signal bandwidth is about 125 Mhz so that the characteristics of the diplexing filter 18 are defined over about 375 MHz centered on the middle of the transmit signal band.

In regard to the design of the receiver subsystem 14, the first step in the receiver process is the separation of the upper and lower sidebands. This process is known to those skilled in the art; however, for the purpose of clarifying this disclosure, only important features of the process are reviewed.

Figure 27:
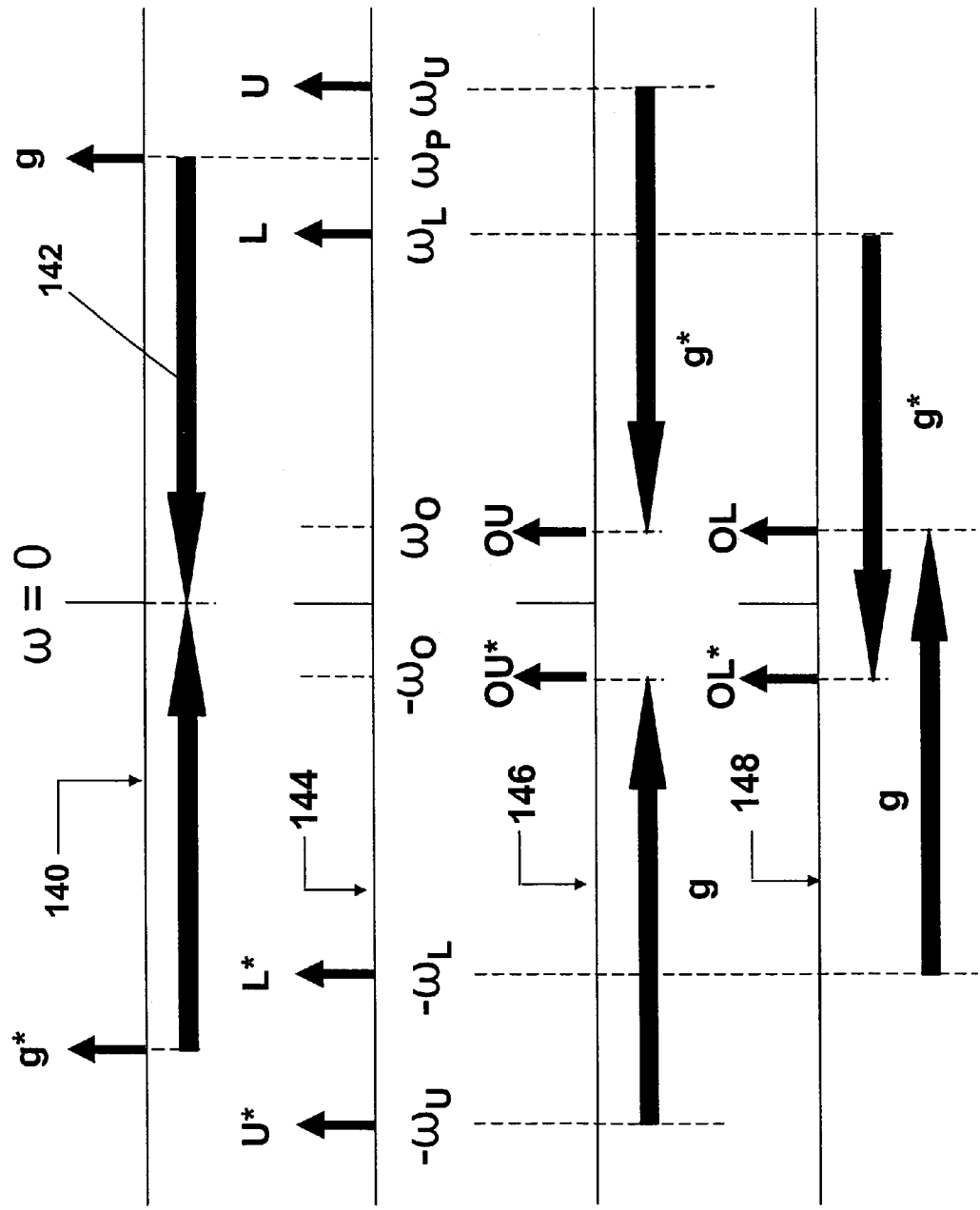
FIG. 27 depicts a frequency plan for separating the upper and lower sidebands in the receiver subsystem.

In FIG. 27, four schemas in double-sided frequency space with zero frequency in the middle are illustrated. In the first schema 140, the translating frequency $\omega_P$ is illustrated and translation vectors 142 with length equal to the translating frequency are shown. In a second schema, the upper and lower sideband frequencies $\omega_U$ and $\omega_L$ are shown relative to the translating frequency $\omega_P$. Also, the conjugate components of the upper and lower sideband frequencies $-\omega_U$ and $-\omega_L$ are shown on the negative frequency scale.

In a third schema 146, the translation is illustrated that takes place from the upper sideband, U, to the output frequency component $\omega_O$, OU, and from the conjugate of the upper sideband, U*, to the conjugate of the output frequency $\omega_O$, OU*. In a fourth schema 148, the lower sideband is also translated to the exact same frequency components OU and OU* except that L* is translated to OU while L is translated to OU*. Thus, the upper and lower sideband components are translated to exactly the same output frequency components. This might lead one to believe that it is not possible to separate the upper and lower sidebands but, as mentioned earlier, the separation process is well-known and frequently used.

Figure 28:
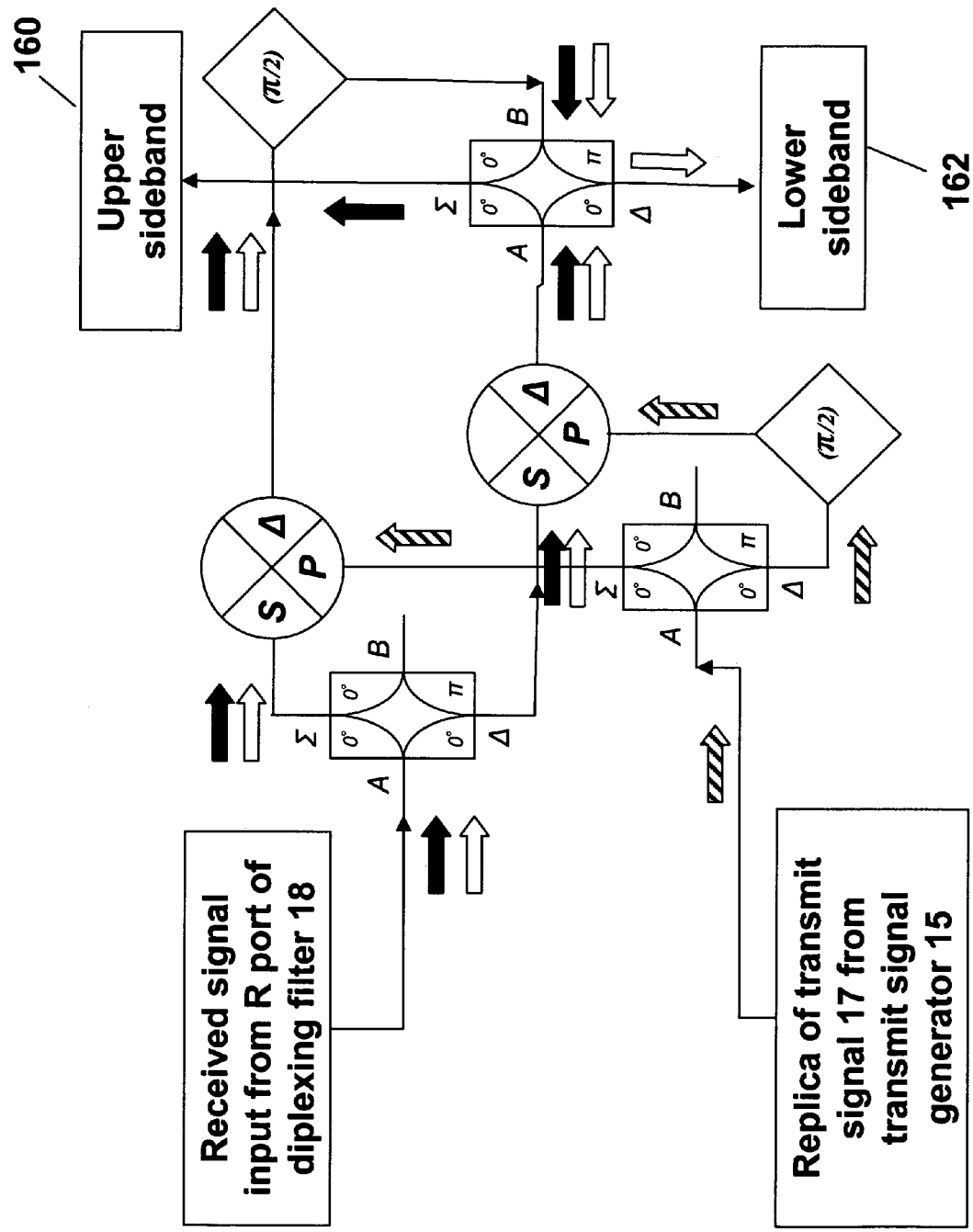
FIG. 28 depicts a circuit for separating upper and lower sidebands.

A block diagram of the separation process is illustrated in FIG. 28. In the figure, the sidebands are recovered by translating the signals using the transmit signal as the translator. Two copies of the translated sideband signals are produced. The copies are generated by translating the incoming modulated signal with two copies of the transmit signal that are in quadrature phase. One of the copies is again shifted in phase by 90 degrees and the two copies are added and subtracted to separate the frequency components of an upper sideband from the frequency components of a lower sideband. Once this separation is complete, the upper sideband and the lower sideband can be partitioned into channels to recover the individual sensor signals.

Figure 29:
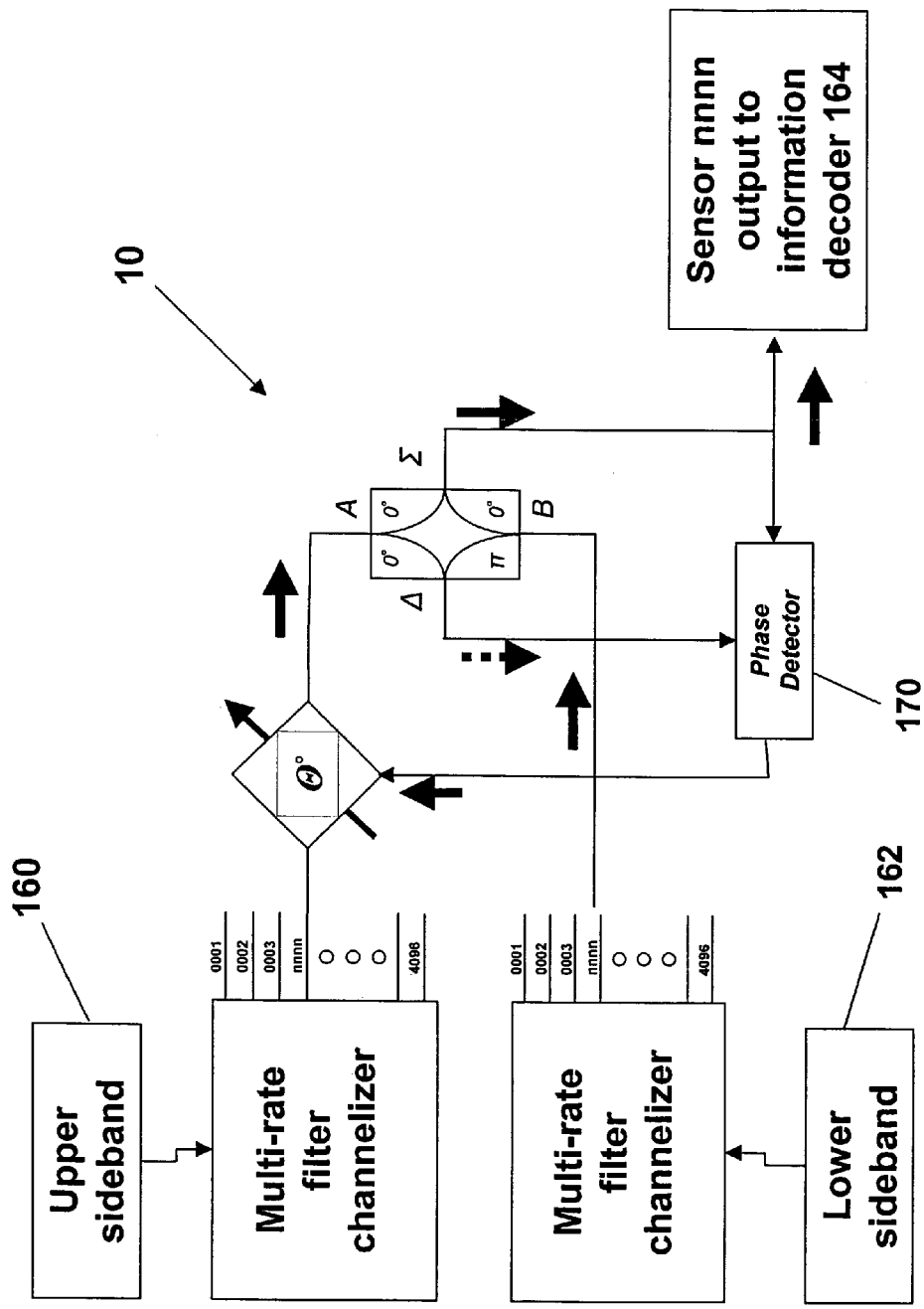
FIG. 29 depicts a channel upper and lower sideband combiner with dynamic phase tracking with the operation repeated on each of the channels.

In FIG. 29, the signal processing steps that are necessary to recover the individual sensor data channels are illustrated. Upper sidebands signals 160 and lower sideband signals 162 are each partitioned into 4096 discrete data channels corresponding to the 4096 modulation-frequency choices available to the approximately three hundred and ninety sensors in the view field of the reader 10. Thus, even though all 4096 channels are processed at this stage, only about three hundred and ninety channels actually contain sensor data. The channels that contain data will be detected in an information decoder 164, which will not be described further in this disclosure since any number of a wide variety of information layers could be used to transfer sensor data to the memory of the reader 10.

The implementation of the diplexer filter 18, the sideband separation circuit, and other receiver subsystems will introduce phase shifts into the upper sideband 160 and the lower sideband 162. Thus, the phase shift of upper sideband 160 and the lower sideband 162 can be quite different so that a simple vector addition of the two sidebands will likely result in a considerable loss of signal-to-noise ratio. By shifting the phase of one of the sidebands before the vector addition, a signal-to-noise ratio improvement of up to 3 dB can be expected. The sideband summing circuit illustrated in FIG. 29 dynamically adjusts a phase of the upper sideband 160 in order to minimize the phase difference between the upper and lower sidebands. Thus, summing the two sidebands in this manner results in approximately 3 dB improvement in the system signal-to-noise-ratio.

A phase-control parameter, which is used to dynamically control the upper sideband phase, is derived by comparing with a phase detector 170, the vector difference of the two sideband signals with the phase of the vector sum of the two sidebands signals.

Figure 30:
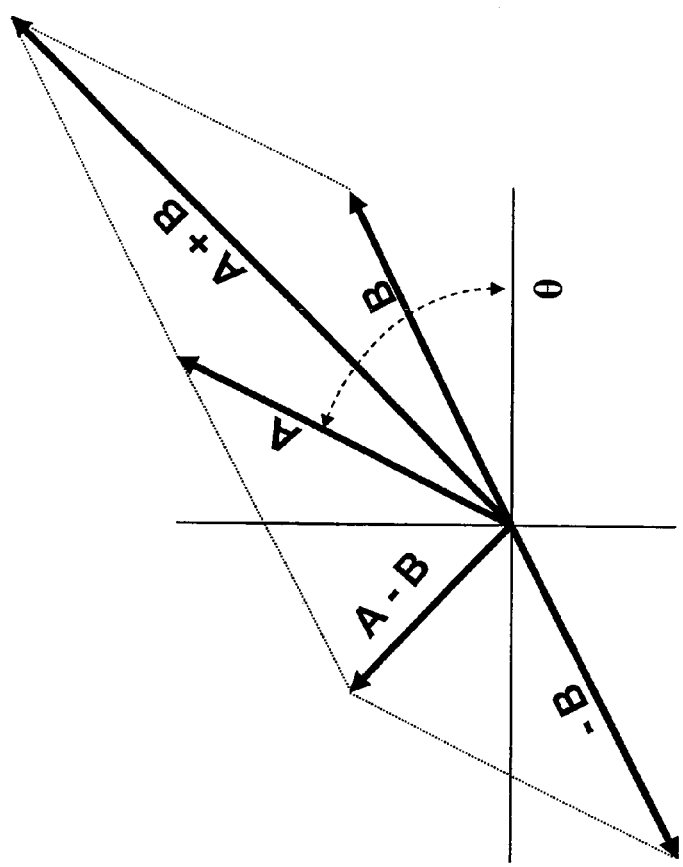
FIG. 30 depicts the phase relationships in the sideband combiner.

In FIG. 30, the phase relationships between upper sideband vector, A, and the lower sideband vector, B are illustrated. The sum vector, A+B, is used as a reference to determine the relative phase of the difference vector, A−B. If the angle, 'θ' is reduced so that the vector A is coincident with the vector B, then the magnitude of the difference vector is seen to approach zero. If the angle 'θ' is reduced further so that A lags B, the phase of the difference vector, A−B, reverses and its magnitude begins to grow. Thus when A leads B, the phase-control parameter is positive and when A lags B, the phase-control parameter is negative, which will force a quiescent condition wherein the phase-control parameter is about zero and the phase of A is equal to the phase of B.

The sum vector, A+B represents an output signal of the sensor 20 encoded with digital information to be transferred to the memory of the reader 10 for further processing. Thus, the system described represents the physical layer of the data circuits linking the sensors 20 with the reader 10. The data transfer layer, which rides on the physical layer, could take many forms depending on the application and types of sensors being deployed. Therefore, for the purposes of this disclosure, the description of the physical layer is all that is required in order to show that the individual sensor channels can be separated.

Figure 31:
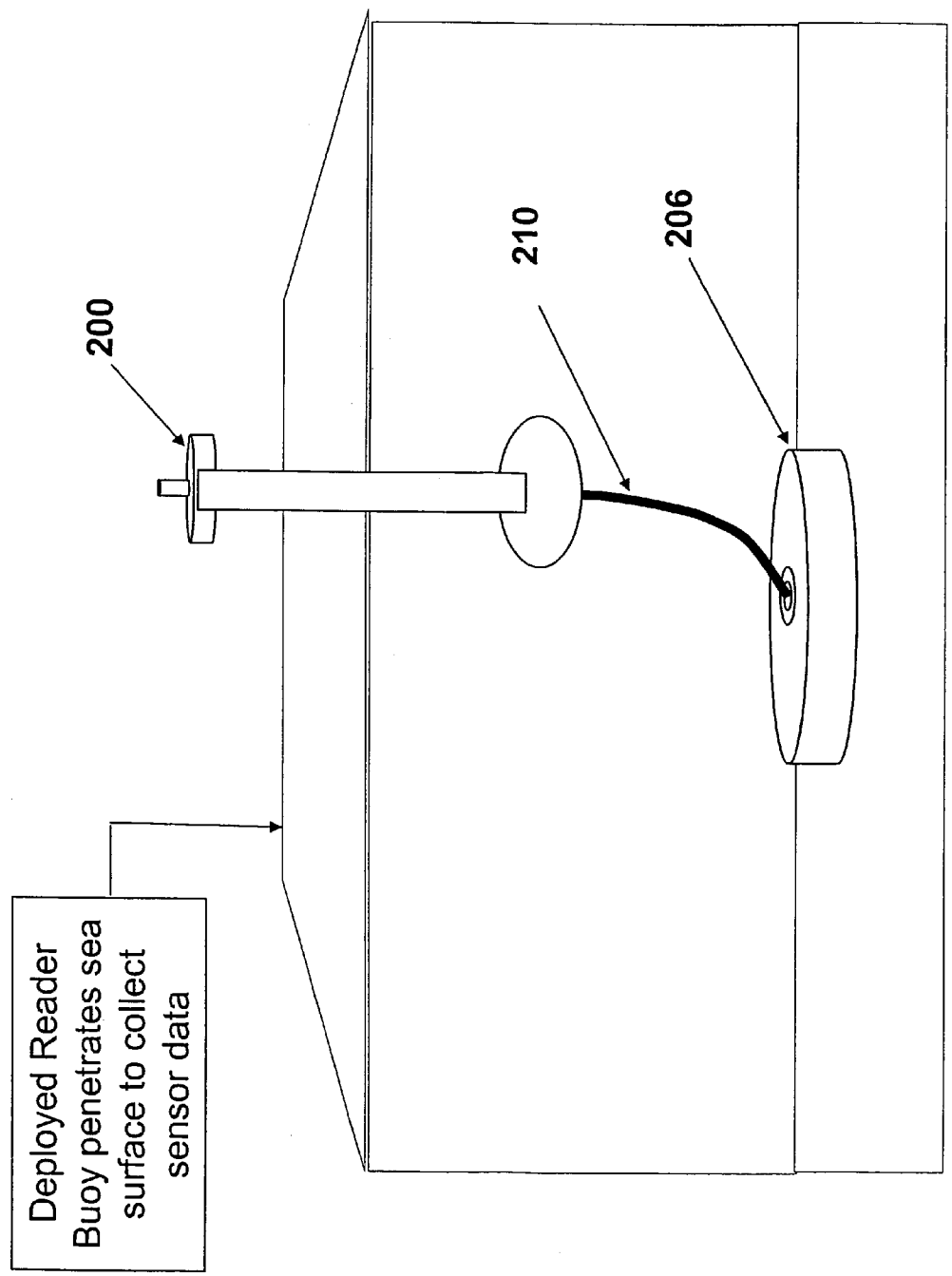
FIG. 31 depicts a deployed reader buoy.

In an operational layout depicted in FIG. 31, a reader buoy 200 (containing the reader 10) is deployed from an undersea Undernet node 206. The reader buoy 200 remains in a semi-fixed location because the reader buoy is tethered to the Undernet node by a cable 210 that provides power to the reader buoy and a communications path between the reader buoy and the Undernet node. The primary function of the reader buoy 200 is to provide antenna height to allow the transmit signals of the reader 10 to reach distant sensor buoys and to detect the return signals from the sensor buoys. The reader buoy 200 can provide a communications link with a satellite or UAV (not shown) in order to tie the Undernet into the global information infrastructure. The process of fusing the data from the sensor field will be carried out in the Undernet node and the fused result can be linked by satellite or UAV to remote information centers.

Figure 32:
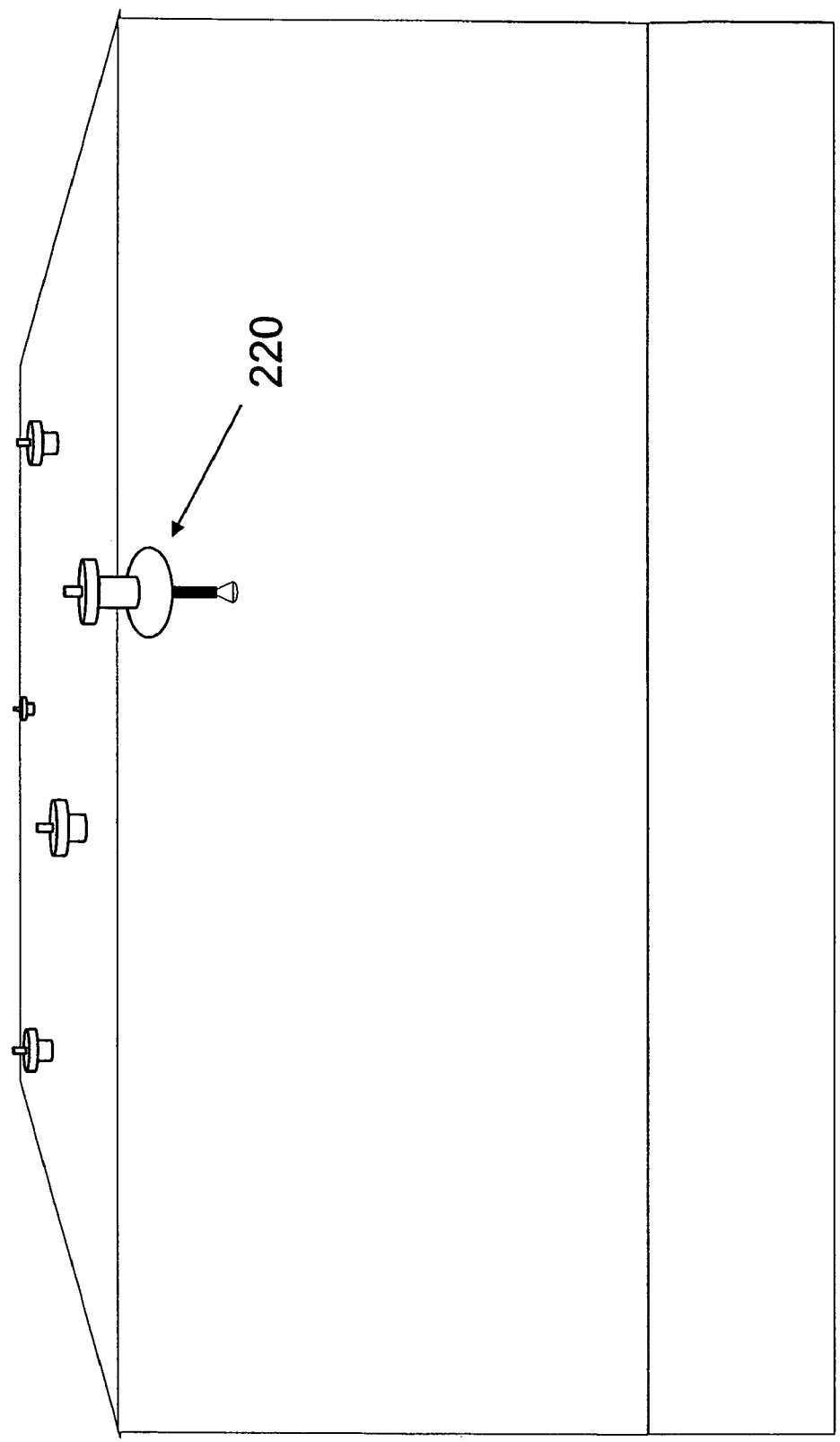
FIG. 32 depicts deployed and drifting sensors buoys.

In FIG. 32, a few drifting sensor buoys 220 (containing sensors 20) are illustrated on an ocean surface. It is assumed that each sensor buoy 220 is capable of sensing an environmental parameter, forming a digital packet of the data, time stamping the packet with GPS time and affixing a GPS location to the packet. The resulting complex data packets will be relayed over the reader-to-sensor physical network layer to the data-fusion system.

A typical application would involve uniformly dispersing the sensors buoys 220 over an area where sensing is required. The embodiment chosen for this disclosure is developed with a reader to reader spacing of about 5 kilometers and a sensor to sensor spacing of about 250 meters.

Figure 33:
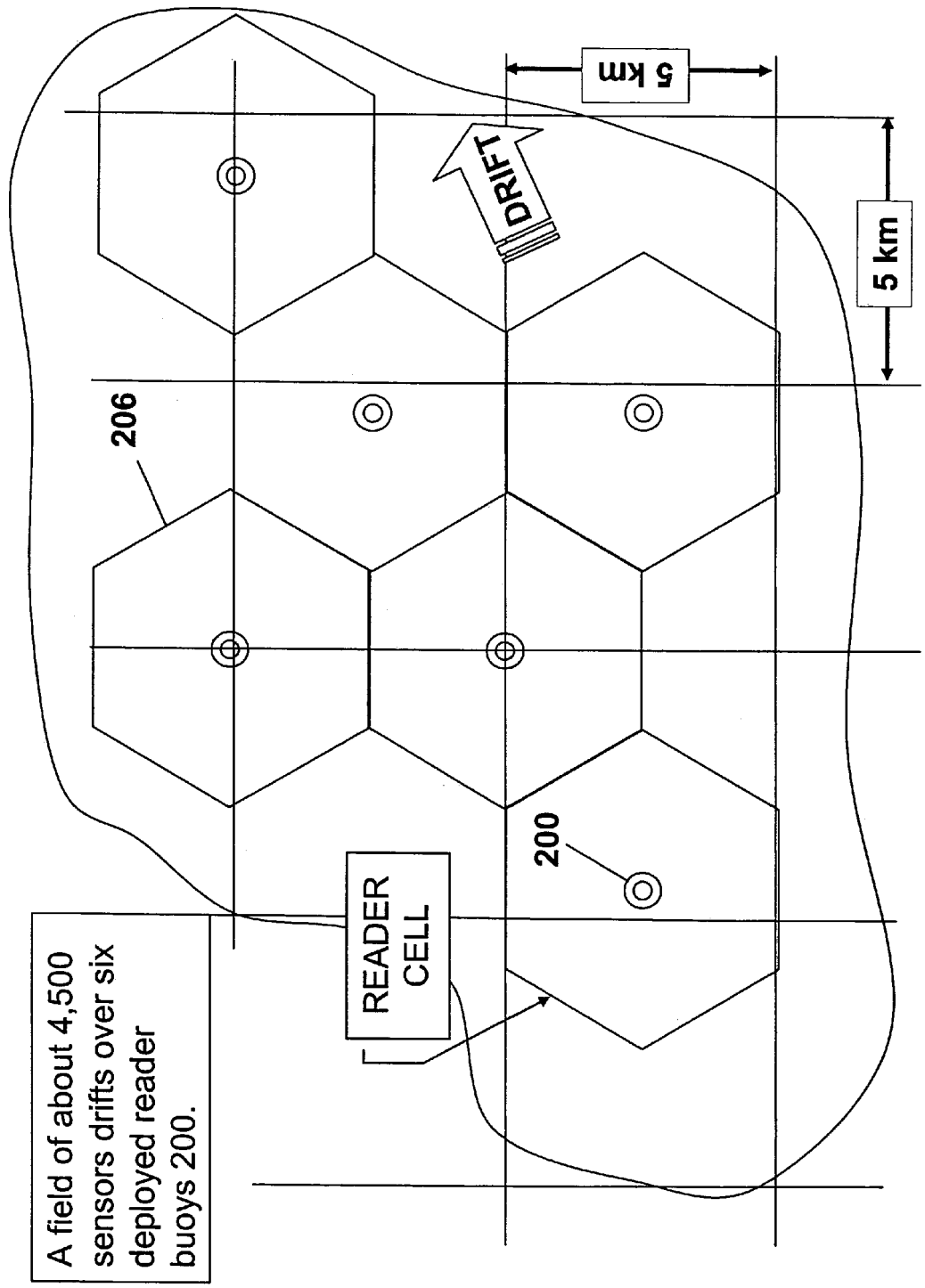
FIG. 33 depicts a field of deployed and drifting sensors and deployed reader buoys.

A typical deployment scenario is illustrated in FIG. 33. Six Undernet nodes 206 and reader buoys 200 are located on a 5 kilometers by 5 kilometers grid at the centers of hexagonal cells, which define the area served by each reader buoy. The region is populated with approximately 4,500 sensors with a target spacing of 250 meters. It is assumed that the sensor field is drifting over the region served by the reader buoys 200.

Each transmit signal by an adjacent reader is frequency hopped using a unique pseudo random code so that adjacent cells do not interfere with each other in the process of recovering sensor data. Thus, when a sensor buoy 220 drifts into another cell, the data of the sensor buoy is collected by the reader 10 of the new cell. As stated earlier, each sensor buoy 220 selects a modulation frequency at random from a set of 4096 frequencies.

The disclosed system can provide a communications infrastructure for deploying large-N sensor arrays in littoral waters. The sensors 20 are independent from the reader 10 so that any sensor can work with any reader. Undernet nodes 206 can be deployed in a region awaiting a command to send up reader buoys 200, in which the command could be given at the time the sensors are dispersed. The sensors 20 can be inexpensive and short-lived while the reader 10 and processing Undernet nodes 206 can be stealthy and secure. The reader buoys 200 can be retrieved by the Undernet nodes 206 for future use while the sensors 20 may be programmed to self-destruct after each application. This application would provide an improved level of stealth in the operation of the large-N array.

To further explain the comparatively low cost of the invention, it is exemplified that each data packet of converted environmental input data comprises 100 bits and that the data packets from the sensors 20 are collected at a rate of about four times per hour.

For low cost, the focus is on a minimal reflection-modulator architecture with the lowest possible cost for the RF components. The RF reflection modulator 24 is part of the sensor buoy 220 terminated in a diode that is modulated by the data to be transferred. Since any link will require an antenna, only a single diode is needed for each reflection modulator.

Figure 34:
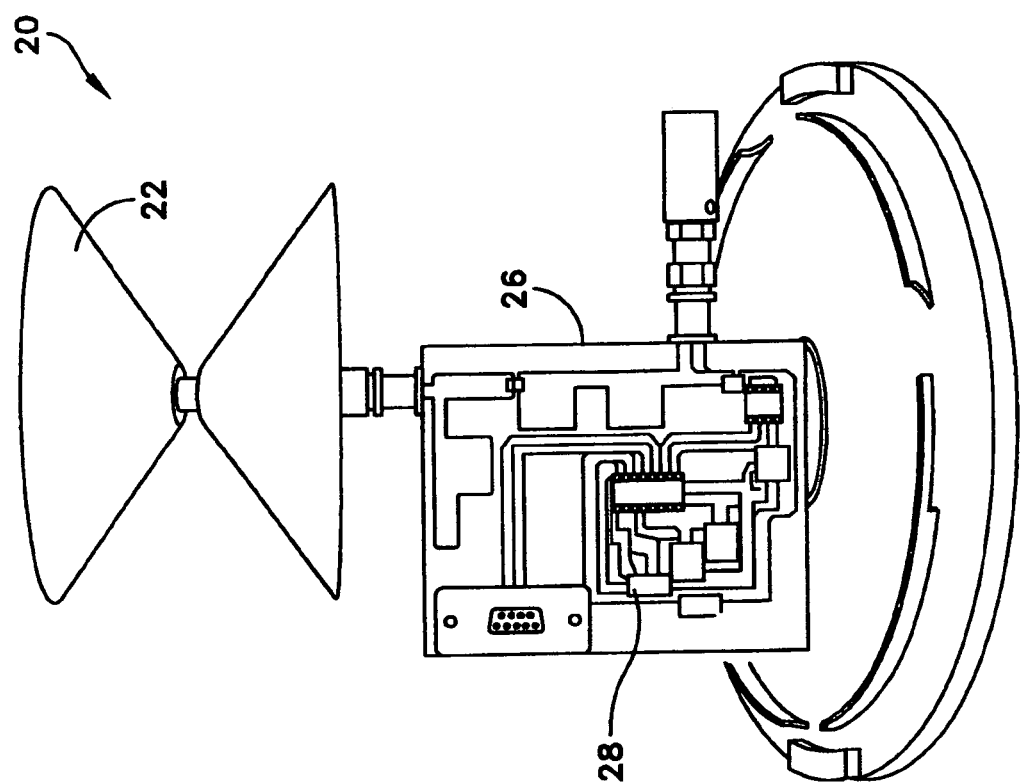
FIG. 34 depicts a reflection modulator.

As depicted in FIG. 34, a 3-GHz a bi-conical antenna 22 is provided in which the antenna is constructed of thin copper foil with a paper backing. The modulator 24 includes a low-cost glass-encapsulated switching diode 26.

Since no filters are needed in the RF circuit, the bandwidth of the modulator 24 can be quite large, for example, a modulation bandwidth greater than 100 MHz and a RF bandwidth approaching 1 GHz centered at 3 GHz.

The reflection modulator 24 requires very little power for operation because it does not transmit any RF signal and, by selecting a proper diode, very little power is needed to modulate the incident RF signal, even when the modulation rate is high.

Implicit is the use of a global positioning system (GPS) to synchronize the clocks of the modulators 24 and associated readers 10 and that the modulator circuits "know" approximately when interrogations from the reader 10 will occur. In the modulator 24 of FIG. 34, a modulator diode 26 would be integrated with a GPS antenna. A RS232 data decoder 28 can use a commercial GPS navigator system to capture and translate GPS position to data packets for transmission so that the transmission of real data could be identified.

Figure 35:
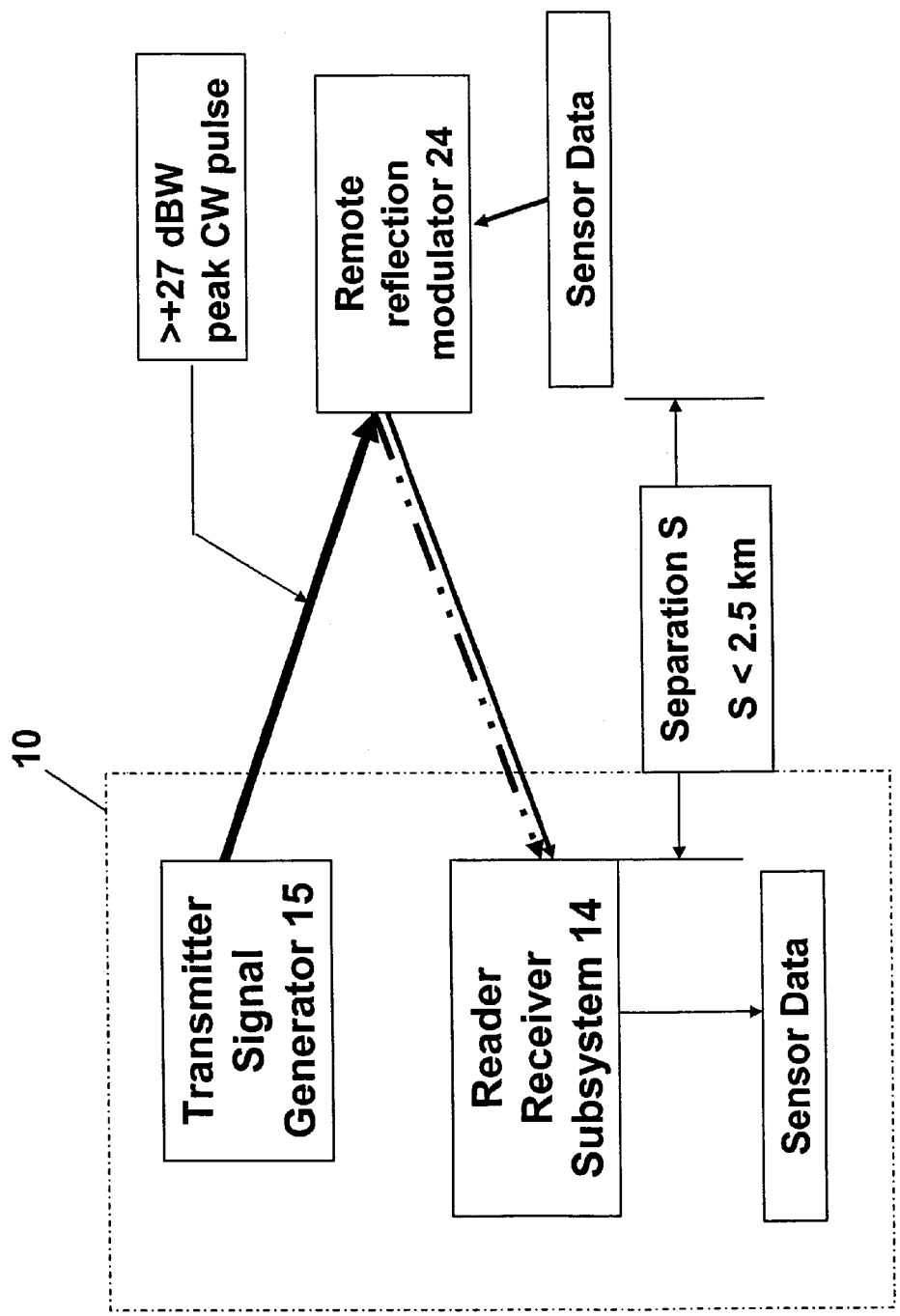
FIG. 35 depicts a schematic of sensor data transferred to a reader when a modulator is interrogated by a reader signal.

As depicted in FIG. 35, the transmit signal generator 15 in operation is within 2.5 kilometers of the modulator 24 periodically emitting a 500-Watt peak power RF pulse that lasts for about 10 seconds and illuminates all modulators within the field of view of the reader 10.

The timing of the pulse of the reader 10 is based on GPS time and every modulator knows approximately when to expect the pulse so that the modulator 24 can begin repeating a one-half second data packet thus insuring that the reflected RF energy contains multiple copies of the data packet.

The reflected RF energy containing multiple copies of data packets from every modulator in a field of view is received by the reader receiver subsystem 14 within 2.5 kilometers of the modulators 24. The reader receiver subsystem 14 and transmitter signal generator 15 may, as shown in FIG. 35, or may not be co-located within the reader 10.

Figure 36:
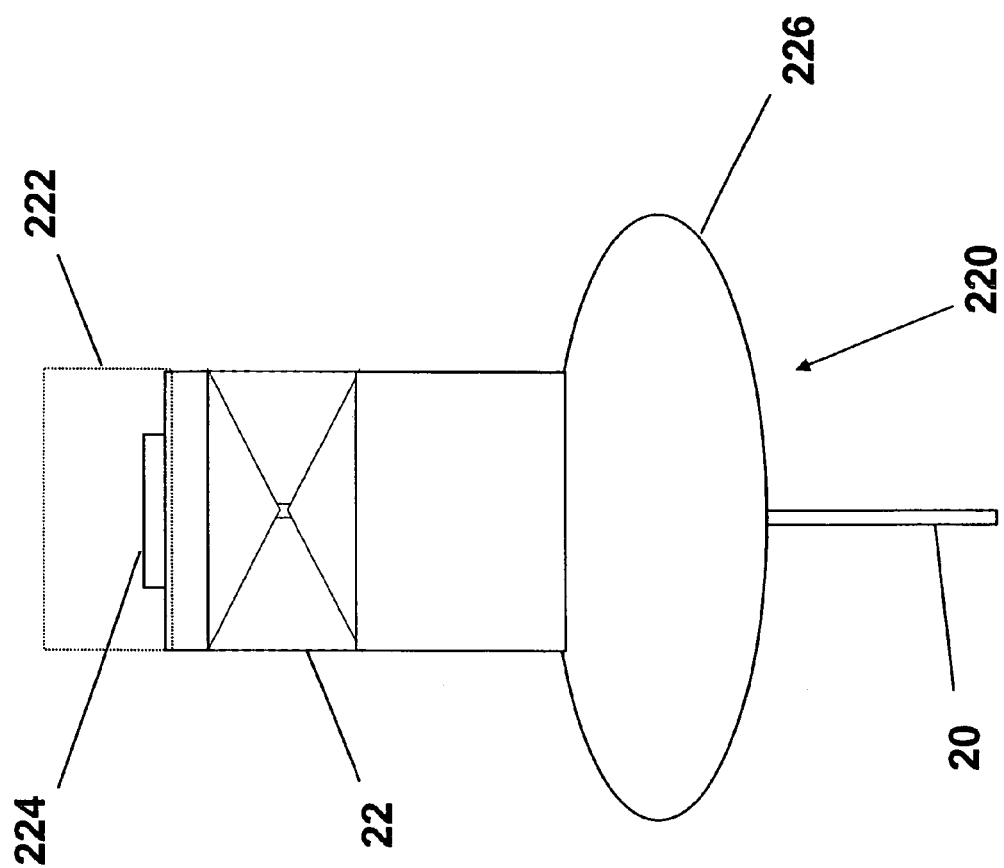
FIG. 36 depicts a sensor buoy.

In FIG. 36, a sensor buoy 220 that incorporates the reflection modulator 24 as part of the sensor 20 is depicted. The bi-conical antenna 22 provides a radially symmetric beam pattern so that the orientation of the sensor buoy 220 will not affect the RF path loss between the reader 10 and the floating sensor buoy.

An air-drop deployment of the sensor buoy 220 would use a parachute that would be stored in a chute compartment 222 above a GPS antenna 224 until the sensor buoy reaches a suitable altitude for parachute release. A buoyancy system 226 keeps the sensor buoy 220 afloat at least until the mission of the sensor 20 is complete.

In order to overcome shadowing by ocean surface waves, the antenna 22 needs to rise above the waterline. The taller the rise of the antenna 22, the less shadowing will be a problem. Wind loading may also present a problem. Pencil thin antennas that have the same radial beam pattern as the antenna 22 but exhibit a much smaller face to the wind may be used. These antennas would be known to those ordinarily skilled in the art. Extending a whip-like structure eighty centimeters above the water line will significantly reduce the effects of wind loading.

Although the reader 10 could be mounted on any fixed or moving platform on or above the surface of the water as previously stated, the reader buoys 200 are typically tethered to undersea network nodes 206 in the region of operation (See FIG. 31). The omni-directional reader antenna 12 rises 3.5 meters above the water surface in order to provide a slant range extending beyond the 2.5 kilometers boundary of the service area.

As previously shown in FIG. 33, a typical regional Undernet comprises the Undernodes 206 and reader buoys 200 with approximately 5 kilometers spacing that service a hexagonal tessellation of a region of interest. The figure depicts a drifting field of 4,500 sensors crossing a six-node Undernet equipped with six reader buoys 200.

As shown and discussed for FIGS. 3-6, as the sea state increases, it becomes more difficult for the reader 10 to illuminate the modulators 24 located in the wave shadows. A radio horizon of 2,500 meters requires that an antenna phase center be greater than 0.4 meters above a smooth earth. Since the reader antenna 12 is assumed to be 3.5 meters above smooth earth, the radio horizon extends beyond 2,500 meters for sea states less than four. Even at an ideal sea state five the 2,500 meter radio horizon will be reached more than half the time.

As depicted in FIG. 37, the wave period associated with sea state five is 9.7 seconds. Thus, in order for the transmit signal generator 15 to illuminate all of the sensor antennas 22 as they crest, the transmit signal generator must remain ON for at least 9.7 seconds. Assuming that the reader transmit signal generator 15 will remain ON for 9.7 seconds and that the sea is stable, this concept of operations will begin to degrade between sea state four and sea state five.

Figure 38:
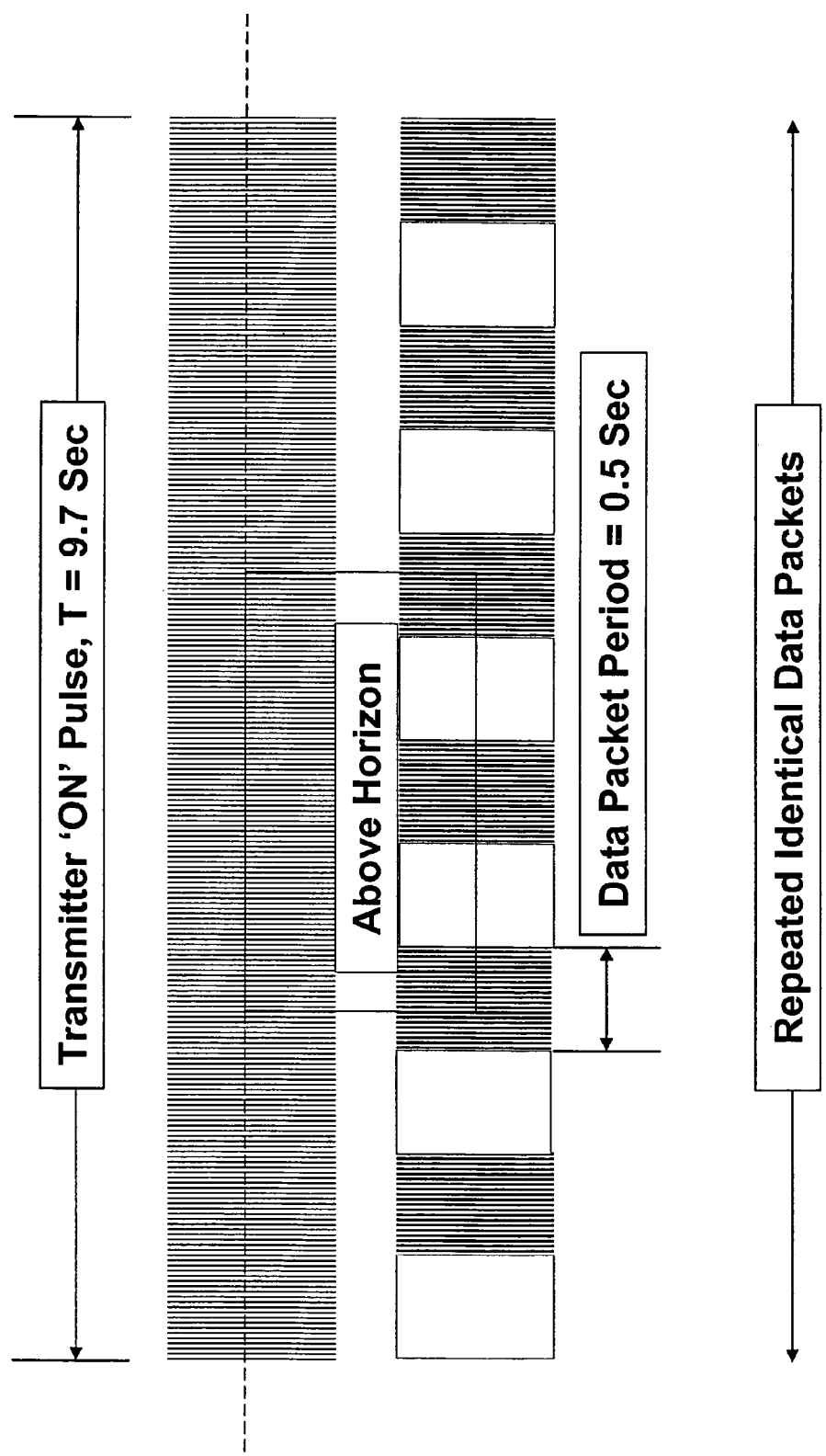
FIG. 38 depicts data packet periods during a transmitter ON pulse.

As depicted in FIG. 38, each data packet is allocated 0.5 seconds, then approximately three identical data packets will be transferred during the interval when the sensor antenna 22 is cresting in a sea state four sea. Thus, there is a high probability of success associated with at least one data packet being accurately transferred during each read interval.

As depicted in FIG. 39, the data packet period, 0.5 seconds, and the data packet length, assumed at 100-bits, can be used to derive an optimum FSK modulation in order to minimize the Bit Error Rate (BER) of the data transfer. The optimum frequency separation between the FSK tones is approximately equal to the square root of two divided by the period of one bit. The optimum separation is 286 Hertz. A detection bandwidth equal to approximately three times the tone separation is necessary in order to capture the principal sidebands of the FSK signal. The detection bandwidth, the path loss and the required signal-to-noise ratio can be used to set the principal parameters of the reader.

The equation of FIG. 40 expresses the power received by the receiver subsystem 14 in terms of system parameters. The system parameters of the reader 10 comprise the transmitter power of the reader 10, the gain of the transmit antenna 12, the gain of the receiver antenna 12 and the wavelength of the signal of the reader. The system parameters of the sensor 20 comprise the efficiency of the modulator 24 and the gain of the antenna 22, which appears as its square since the modulator receives the transmitted pulse and transmits the modulated reflected signal. The remaining variable in the expression is the separation, "S", between the reader 10 and the modulator 24, which is expressed in the same units as the wavelength of the reader.

Figure 41:
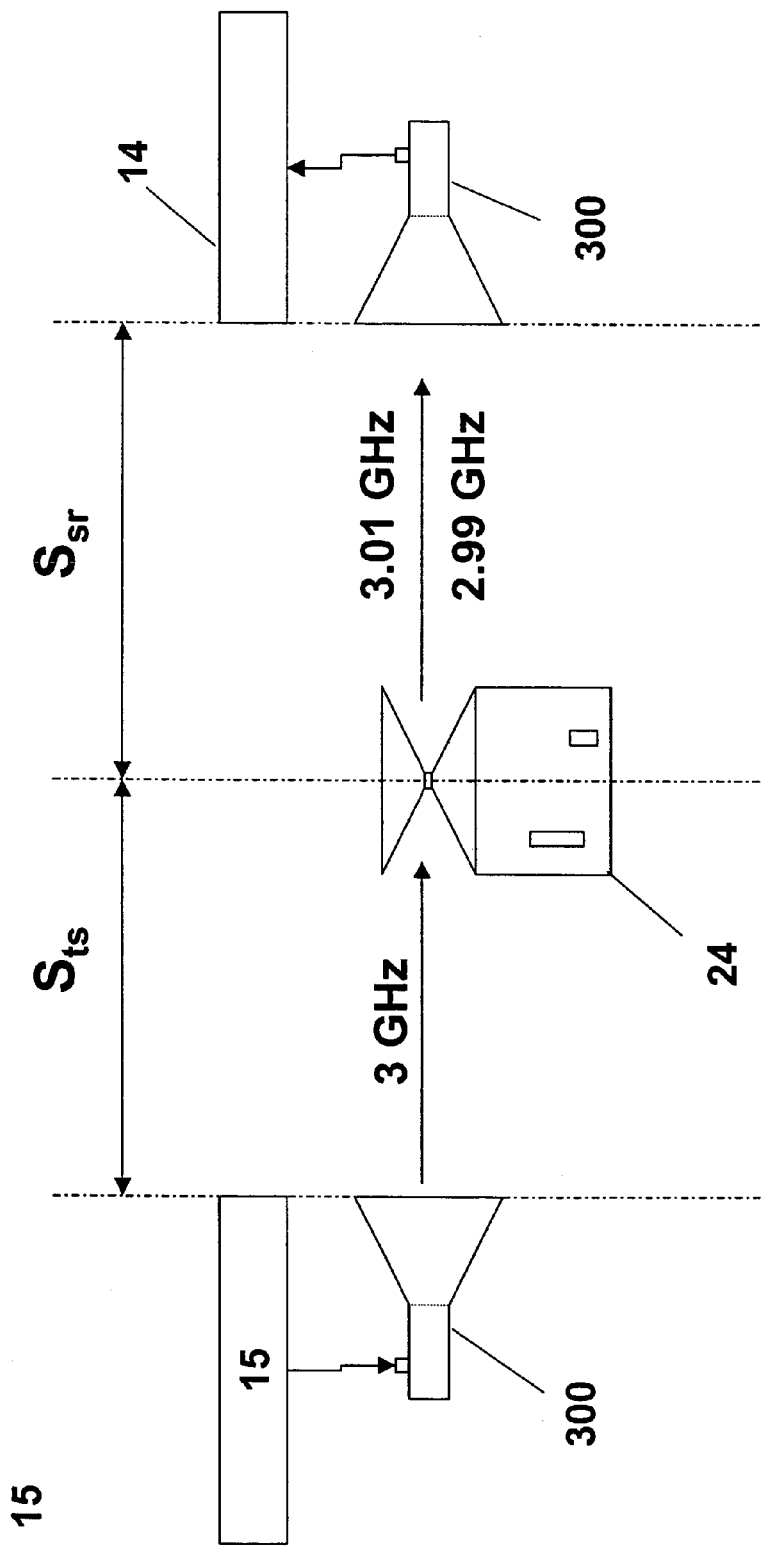
FIG. 41 depicts a modulator range test setup for verifying the range equation.

In FIG. 41, the range equation is exemplified by measuring the performance of the modulator 24 in an anechoic chamber using standard gain horns 300 on the transmit signal generator 15 and the receiver subsystem 14 of the reader 10.

As listed in FIG. 42, the measured results agree with calculated results and demonstrate an ability to predict performance in more realistic environments.

As known in the art and depicted in FIG. 43, using two-tone narrow-band FSK modulation, a signal to noise ratio of 15 dB will yield a BER of about 1E-6. Assuming an operating frequency of 3 GHz and a line of sight path of 2,500 meters, the calculated path loss is about 184 dB. Using a 3-dB noise figure and the noise bandwidth previously calculated, the receiver noise floor is −172 dB. Thus, in order to achieve a 15 dB signal to noise ratio, a transmit power of 500 Watts will be needed.

As shown in FIG. 44, depending on the number of READS per hour, the average transmitted power of the reader 10 can be quite reasonable.

Figure 45:
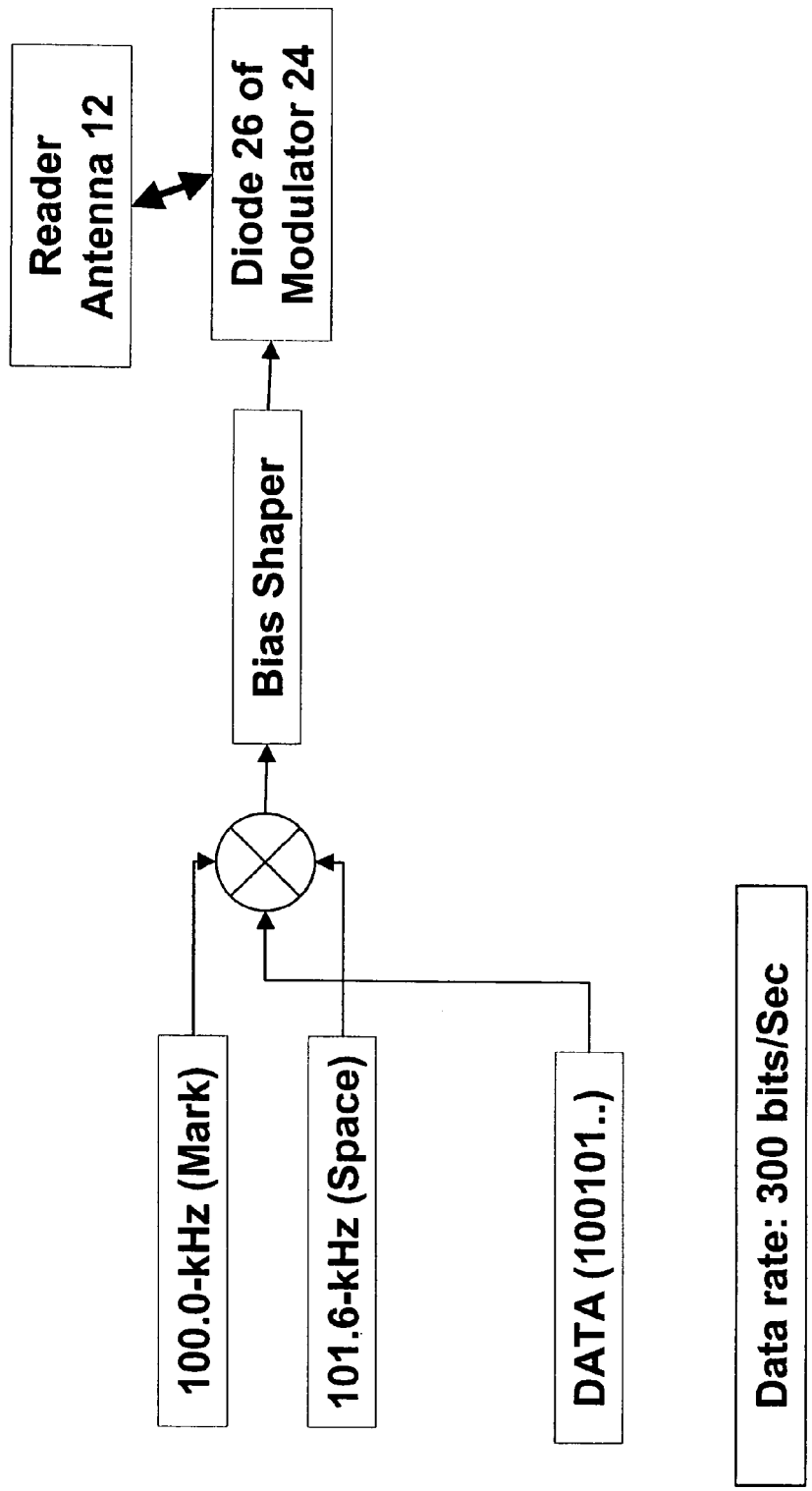
FIG. 45 depicts a FSK modulator in operation.

FIG. 45 depicts the modulator 24 in operation where the return signal is bi-phase modulated at 100.8 kHz and each principal sideband is FSK modulated with an FSK shift of ±0.8 kHz. The receiver subsystem 14 may recover only one sideband or gain 3 dB signal to noise by combining both sidebands in a more complicated receiver. A 3 dB gain here would reduce transmit power by the same ratio.

Figure 46:
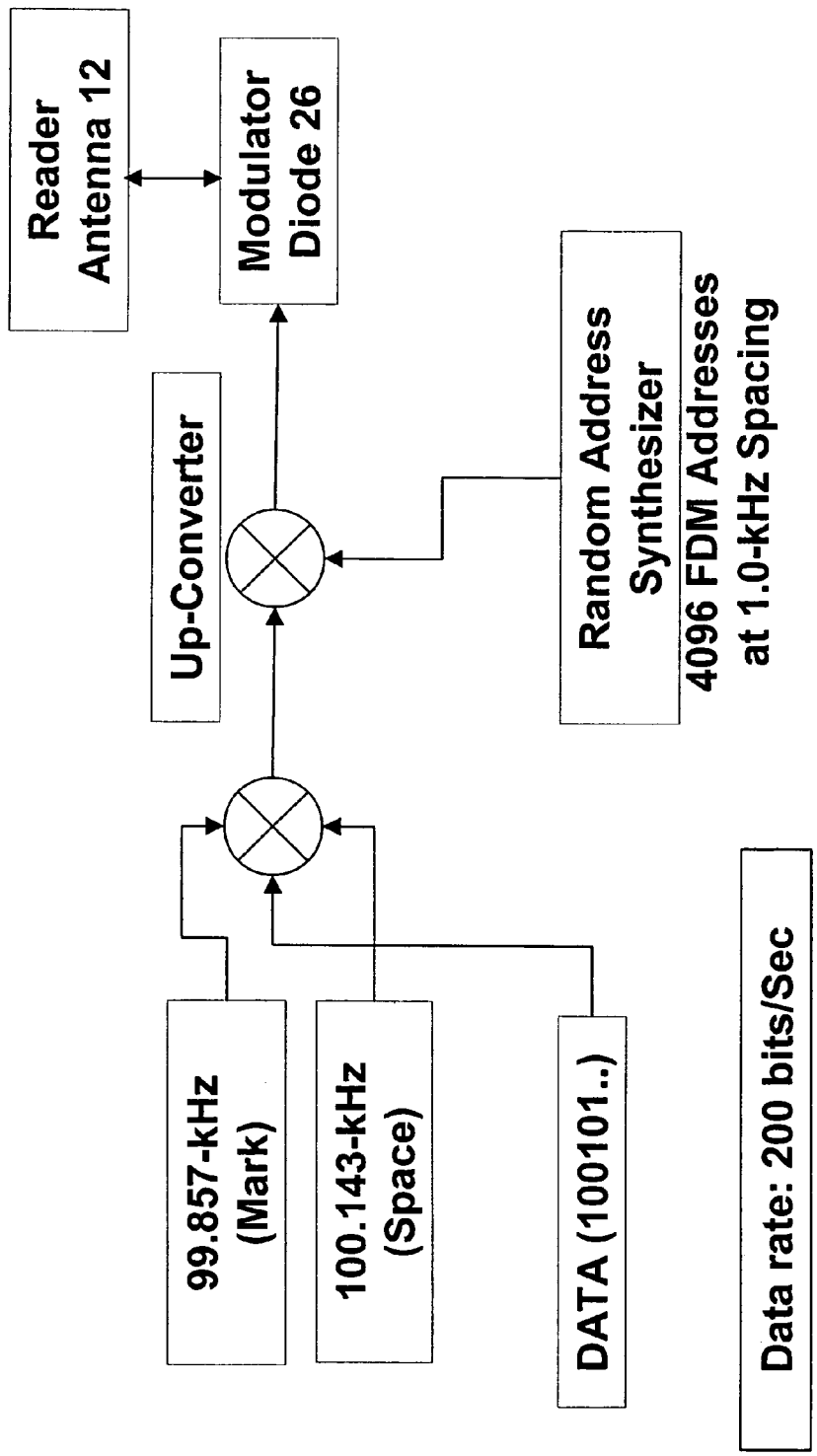
FIG. 46 depicts a FSK modulator and an address generator in operation.

As depicted in FIG. 46 and as previously discussed, in order to accommodate multiple modulators within the same field of view and be able to discriminate among the return signals, it is necessary to provide a means of addressing each modulator 24. A practical addressing scheme must recognize the independence of the modulators 24 and the reader 10. Each reader 10 must be able to recover data from a number of modulators 24 within a field of view without prior knowledge of the modulator address. Any reader 10 must be able to read any modulator 24.

The size of the address set must be greater than the number of modulators 24 in a field of view of the reader 10 and the receiver subsystem 14 must be able to discriminate between all addresses in the set.

The result is valid if addresses are assigned at random during manufacture or if each modulator selects a new address at random for each data packet. The latter concept of operations places only a small additional burden on the electronics of the modulator 24 and has the added benefit that some data packets from each sensor 20 will get transferred because the modulators involved in frequency collisions will be different for each transmission.

The penalty for modulator simplicity is the 500-Watt peak power required by the transmit signal generator 15 of the reader 10 in order to achieve a 15 dB signal-to-noise ratio at a 2.5 kilometer range. However, it should be noted that the transmit power is based on an assumed radially symmetric beam pattern with no more than 10 dB gain. This is equivalent to an ERP of 37 dBW. If the gain of the antenna 12 were increased by, for example, segmenting the horizontal space, then the peak transmit power could be reduced accordingly. With ten radial segments, the antenna gain in each segment could be increased to 20 dB, which would reduce the peak transmit power to 50 Watts for the same receive signal to noise ratio. Illuminating all ten segments would still require the same battery power since ten pulses would be required to cover the horizon.

As described above in the working examples and method of use, the disclosed system can provide a comparatively inexpensive communications infrastructure for deploying large-N sensor arrays in littoral waters. The sensors 20 are independent from the reader 10 so that any sensor can work with any reader. Undernet nodes 206 can be deployed in a region awaiting a command to send up reader buoys 200, in which the command could be given at the time the sensors are dispersed. The sensors 20 can be inexpensive and short-lived while the reader 10 and processing Undernet nodes 206 can be stealthy and secure. The reader buoys 200 can be retrieved by the Undernet nodes 206 for future use while the sensors 20 may be programmed to self-destruct after each application. This application would provide an improved level of stealth in the operation of the large-N array.

The system of the present invention may be modified for digital implementation of transfer functions without undue experimentation by one ordinarily skilled in the art.

Thus, the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method for recovering environmental data from an area, said method comprising the steps of:
    deploying a plurality of sensors within the area, each sensor pre-assigned a modulation frequency;
    deploying a reader;
    gathering the environmental data with at least one sensor of the plurality of sensors;
    converting the environmental data to a digital data packet;
    processing the digital data packet to form encoded data;
    storing the encoded data as a data frame;
    outputting a modulation sequence with the sensor;
    transmitting a transmit signal from the reader to the plurality of sensors;
    replicating the transmit signal at the reader;
    producing a reflected signal at each sensor in response to the transmit signal;
    assigning a modulation frequency to the reflected signal;
    receiving the reflected signal at the reader with the assigned modulation frequency from the plurality of the sensors;
    translating the received reflected signal with the replicated transmit signal;
    separating frequency components of the translated received reflected signal into upper and lower sidebands;
    minimizing a phase difference between the upper and lower-sidebands to improve signal to noise ratios;
    partitioning the upper and lower sidebands into unique data channels;
    processing the data channels;
    outputting the encoded data from the processed data channels; and
    decoding the encoded data to retrieve the digital data packet and the environmental data.

2. The method in accordance with claim 1, said method comprising an additional step of deriving an optimum frequency shift keyed modulation with use of a data packet period and data packet length in order to minimize a bit error rate of data transfer between the reader and at least one of the sensors.

3. The method in accordance with claim 2, wherein the reader is deployed within the area of environmental data to be recovered.

4. The method in accordance with claim 3, said method further comprising the steps of deploying at least one undersea node and anchoring the reader with the undersea node.

5. The method in accordance with claim 4, said method further comprising the step of controlling the operation of the reader with the deployed undersea node.

6. The method in accordance with claim 5, said method further comprising a step of providing a communications link to tie the environmental data into a global information infrastructure.

7. The method in accordance with claim 6, said method further comprising a step of retrieving the reader with the undersea node after recovery of the environmental data and subsequently deploying the reader from the undersea nodes for additional recovery of environmental data.

8. The method in accordance with claim 7, said method further comprising a step of programming each of the plurality of sensors to self-destruct after a recovery of the environmental data.

9. The method of claim 2, wherein said deployment step comprises deploying a plurality of readers and wherein a reader of the plurality of readers and at least one of the sensors tessellate with another reader of the plurality of readers and at least one of the sensors thereby combining to recover environmental data from an extended area.

10. The method in accordance with claim 9, said method further comprising the steps of deploying at least one undersea node and anchoring the reader with the undersea node.

11. The method in accordance with claim 10, said method further comprising a step of controlling the operation of the reader with the deployed undersea node.

12. The method in accordance with claim 11, said method further comprising a step of providing a communications link to tie the environmental data into a global information infrastructure.

13. The method in accordance with claim 12, said method further comprising a step of retrieving the reader with the undersea node after recovery of the environmental data and subsequently deploying the reader from the undersea nodes for additional recovery of environmental data.

14. The method in accordance with claim 13, said method further comprising a step of programming each of the plurality of sensors to self-destruct after a sensing operation.

15. A system for recovering environmental data from an area, said system comprising:
- a plurality of sensors deployable over the area for gathering the environmental data, each sensor pre-assigned a modulation frequency;
- a converter electronically integrated with each sensor for converting the environmental data to a digital data packet and processing the digital data packet to form encoded data;
- a diode electronically integrated with said sensor and capable of outputting a modulation sequence while producing a reflected signal in response to a received signal;
- a deployable reader including a transmitter of a transmitted and replicated signal and a receiver in electronic connection with said transmitter;
- a diplexing filter electronically integrated with said reader and capable of translating a received signal with a replicated signal and separating frequency components into upper and lower sidebands while partitioning the upper and lower sidebands into unique data channels and processing the data channels to output encoded data from the processed data channels and decoding the encoded data to retrieve digital data packets and environmental data.

16. The system in accordance with claim 15, said system further comprising at least one deployable undersea node capable of anchoring said reader and controlling the operation of said reader.

17. The system in accordance with claim 16, said system further comprising a communications link electronically integrated in said undersea node to tie the environmental data into a global information infrastructure.

* * * * *

UNITED STATES PATENT AND TRADEMARK OFFICE
CERTIFICATE OF CORRECTION

PATENT NO.        : 7,269,097 B1
APPLICATION NO.   : 11/363302
DATED             : September 11, 2007
INVENTOR(S)       : Donald H. Steinbrecher It is certified that error appears in the above-identified patent and that said Letters Patent is hereby corrected as shown below:

On Title page item 54 and col. 1, line 1-2
Please change title of invention from "METHOD FOR RECOVERING DATA FROM A LARGE ARRAY OF LOST-COST SENSORS" to --METHOD FOR RECOVERING DATA FROM A LARGE ARRAY OF LOW-COST SENSORS--.

Signed and Sealed this

Third Day of June, 2008

JON W. DUDAS
*Director of the United States Patent and Trademark Office*